(12) United States Patent
Irwin et al.

(10) Patent No.: US 12,508,295 B2
(45) Date of Patent: Dec. 30, 2025

(54) PISCINE-DERIVED PYY PEPTIDES FOR USE IN TREATING A METABOLIC DISORDER

(71) Applicant: University of Ulster, Coleraine (GB)

(72) Inventors: Nigel Irwin, Ballymoney (GB); Peter Raymond Flatt, Portstewart (GB)

(73) Assignee: University of Ulster, Coleraine (GB)

( * ) Notice: Subject to any disclaimer, the term of this patent is extended or adjusted under 35 U.S.C. 154(b) by 0 days.

(21) Appl. No.: 17/050,749

(22) PCT Filed: Apr. 26, 2019

(86) PCT No.: PCT/EP2019/060824
§ 371 (c)(1),
(2) Date: Oct. 26, 2020

(87) PCT Pub. No.: WO2019/207151
PCT Pub. Date: Oct. 31, 2019

(65) Prior Publication Data
US 2021/0228679 A1    Jul. 29, 2021

(30) Foreign Application Priority Data
Apr. 26, 2018 (GB) ..................... 1806825

(51) Int. Cl.
A61K 38/00   (2006.01)
A61K 38/17   (2006.01)
A61P 3/10    (2006.01)

(52) U.S. Cl.
CPC .......... *A61K 38/1706* (2013.01); *A61P 3/10* (2018.01)

(58) Field of Classification Search
CPC .......... A61K 38/1706; A61P 3/10; A61P 3/00; A61P 5/48; C07K 14/461
See application file for complete search history.

(56) References Cited

U.S. PATENT DOCUMENTS

| 8,202,836 B2 * | 6/2012 | Moore ................. | C07K 14/575 514/6.9 |
| 2009/0209461 A1 * | 8/2009 | Cowley .................. | A61P 43/00 514/649 |
| 2016/0263197 A1 * | 9/2016 | Oestergaard ........... | A61K 38/22 |

FOREIGN PATENT DOCUMENTS

| WO | WO2003026591 A2 * | 4/2003 | ......... A61K 38/1709 |
| WO | 2015/071355 A1 | 5/2015 | |
| WO | 2015/177572 A1 | 11/2015 | |

OTHER PUBLICATIONS

Schmidt et al. Effects of PYY3-36 and GLP-1 on energy intake, energy expenditure, and appetite in overweight men. Am J Physiol Endocrinol Metab 306: E1248-E1256, 2014 (Year: 2014).*
Merck manual accessed on Feb. 22, 2023 at https://www.merckmanuals.com/home/children-s-health-issues/hereditary-metabolic-disorders/overview-of-carbohydrate-metabolism-disorders by Matt Demczko (Year: 2022).*
Merck manual accessed on Feb. 22, 2023 at https://www.merckmanuals.com/home/children-s-health-issues/hereditary-metabolic-disorders/overview-of-amino-acid-metabolism-disorders by Matt Demczko (Year: 2022).*
Merck manual accessed on Feb. 22, 2023 at https://www.merckmanuals.com/home/children-s-health-issues/hereditary-metabolic-disorders/other-rare-hereditary-disorders-of-lipid-metabolism by Matt Demczko (Year: 2022).*
Yang et al. The Related Metabolic Diseases and Treatments of Obesity. Healthcare 2022, 10, 1616. (Year: 2022).*
The National Pancreas foundation. Common Disorders of the Pancreas. Accessed on Feb. 22, 20233 at https://pancreasfoundation.org/patient-information/about-the-pancreas/common-disorders-of-the-pancreas/ (Year: 2022).*
Ostergaard et al. (Med. Chem. 2018, 61, 23, 10519-10530). Design of Y2 Receptor Selective and Proteolytically Stable PYY3-36 Analogues (Year: 2018).*
Gonzalez et al. Molecular characterization, appetite regulatory effects and feeding related changes of peptide YY in goldfish. General and Comparative Endocrinology 166 (2010) 273-279 (Year: 2010).*
De Silva, A., et al., "The Gut Hormones PYY3-36 and GLP-17-36 Amide Reduce Food Intake and Modulate Brain Activity in Appetite Centers in Humans," Cell Metabolism 14(5-2):700-706, Nov. 2011.
International Search Report and Written Opinion mailed Aug. 13, 2019, issued in International Application No. PCT/EP2019/060824, filed Apr. 26, 2019, 10 pages.
International Preliminary Report on Patentability mailed Oct. 27, 2020, issued in International Application No. PCT/EP2019/060824, filed Apr. 26, 2019, 6 pages.

* cited by examiner

*Primary Examiner* — Li N Komatsu
*Assistant Examiner* — Mercy H Sabila
(74) *Attorney, Agent, or Firm* — Christensen O'Connor Johnson Kindness PLLC

(57) ABSTRACT

The present invention relates to peptides for use in the treatment of metabolic disorders. In particular, the present invention relates to peptides for use in the treatment of diabetes. According to the present invention, there is provided a peptide for use in the treatment of a metabolic disorder: wherein the peptide is a piscine-derived PYYor fragment or analogue thereof.

8 Claims, 21 Drawing Sheets

Specification includes a Sequence Listing.

SEQUENCE LISTING

```
<160> NUMBER OF SEQ ID NOS: 11

<210> SEQ ID NO 1
<211> LENGTH: 5
<212> TYPE: PRT
<213> ORGANISM: Unknown
<220> FEATURE:
<223> OTHER INFORMATION: Consensus Sequence

<400> SEQUENCE: 1

Thr Arg Gln Arg Tyr
1               5

<210> SEQ ID NO 2
<211> LENGTH: 10
<212> TYPE: PRT
<213> ORGANISM: Unknown
<220> FEATURE:
<223> OTHER INFORMATION: Consensus Sequence

<400> SEQUENCE: 2

Tyr Ile Asn Leu Ile Thr Arg Gln Arg Tyr
1               5                   10

<210> SEQ ID NO 3
<211> LENGTH: 14
<212> TYPE: PRT
<213> ORGANISM: Unknown
<220> FEATURE:
<223> OTHER INFORMATION: Consensus Sequence

<400> SEQUENCE: 3

Ala Leu Arg His Tyr Ile Asn Leu Ile Thr Arg Gln Arg Tyr
1               5                   10

<210> SEQ ID NO 4
<211> LENGTH: 36
<212> TYPE: PRT
<213> ORGANISM: Petromyzon marinus

<400> SEQUENCE: 4

Met Pro Pro Lys Pro Asp Asn Pro Ser Pro Asp Ala Ser Pro Glu Glu
1               5                   10                  15

Leu Ser Lys Tyr Met Leu Ala Val Arg Asn Tyr Ile Asn Leu Ile Thr
            20                  25                  30
```

Arg Gln Arg Tyr
        35

<210> SEQ ID NO 5
<211> LENGTH: 36
<212> TYPE: PRT
<213> ORGANISM: Amia calva

<400> SEQUENCE: 5

Tyr Pro Pro Lys Pro Glu Asn Pro Gly Glu Asp Ala Pro Pro Glu Glu
1               5                   10                  15

Leu Ala Arg Tyr Tyr Ser Ala Leu Arg His Tyr Ile Asn Leu Ile Thr
                20                  25                  30

Arg Gln Arg Tyr
        35

<210> SEQ ID NO 6
<211> LENGTH: 36
<212> TYPE: PRT
<213> ORGANISM: Oncorhynchus mykiss

<400> SEQUENCE: 6

Tyr Pro Pro Lys Pro Glu Asn Pro Gly Glu Asp Ala Pro Pro Glu Glu
1               5                   10                  15

Leu Ala Lys Tyr Tyr Thr Ala Leu Arg His Tyr Ile Asn Leu Ile Thr
                20                  25                  30

Arg Gln Arg Tyr
        35

<210> SEQ ID NO 7
<211> LENGTH: 37
<212> TYPE: PRT
<213> ORGANISM: Acipenser baeri

<400> SEQUENCE: 7

Tyr Phe Pro Pro Lys Pro Glu His Pro Gly Asp Asp Ala Pro Ala Glu
1               5                   10                  15

Asp Val Val Lys Tyr Tyr Thr Ala Leu Arg His Tyr Ile Asn Leu Ile
                20                  25                  30

Thr Arg Gln Arg Tyr
        35

<210> SEQ ID NO 8
<211> LENGTH: 36
<212> TYPE: PRT
<213> ORGANISM: Homo sapiens

<400> SEQUENCE: 8

Tyr Pro Ile Lys Pro Glu Ala Pro Gly Glu Asp Ala Ser Pro Glu Glu
1               5                   10                  15

Leu Asn Arg Tyr Tyr Ala Ser Leu Arg His Tyr Leu Asn Leu Val Thr
                20                  25                  30

Arg Gln Arg Tyr
        35

<210> SEQ ID NO 9
<211> LENGTH: 36
<212> TYPE: PRT
<213> ORGANISM: Artificial Sequence
<220> FEATURE:
<223> OTHER INFORMATION: Synthetic

```
-continued

<400> SEQUENCE: 9

Met Pro Ile Lys Pro Asp Asn Pro Ser Pro Asp Ala Ser Pro Glu Glu
1               5                   10                  15

Leu Ser Lys Tyr Met Leu Ala Val Arg Asn Tyr Ile Asn Leu Ile Thr
            20                  25                  30

Arg Gln Arg Tyr
        35

<210> SEQ ID NO 10
<211> LENGTH: 36
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (35)..(35)
<223> OTHER INFORMATION: wherein Xaa at position 35 is defined as D-Arg

<400> SEQUENCE: 10

Met Pro Pro Lys Pro Asp Asn Pro Ser Pro Asp Ala Ser Pro Glu Glu
1               5                   10                  15

Leu Ser Lys Tyr Met Leu Ala Val Arg Asn Tyr Ile Asn Leu Ile Thr
            20                  25                  30

Arg Gln Xaa Tyr
        35

<210> SEQ ID NO 11
<211> LENGTH: 36
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (35)..(35)
<223> OTHER INFORMATION: wherein Xaa at position 35 is defined as D-Arg

<400> SEQUENCE: 11

Met Pro Ile Lys Pro Asp Asn Pro Ser Pro Asp Ala Ser Pro Glu Glu
1               5                   10                  15

Leu Ser Lys Tyr Met Leu Ala Val Arg Asn Tyr Ile Asn Leu Ile Thr
            20                  25                  30

Arg Gln Xaa Tyr
        35
```

PISCINE-DERIVED PYY PEPTIDES FOR USE IN TREATING A METABOLIC DISORDER

CROSS-REFERENCES TO RELATED APPLICATIONS

This application is a National Stage of International Application No. PCT/EP2019/060824, filed Apr. 26, 2019, which claims priority to Great Britain Application No. 1806825.4, filed Apr. 26, 2018, the disclosures of which are incorporated herein by reference in their entirety.

STATEMENT REGARDING SEQUENCE LISTING

The sequence listing associated with this application is provided in text format in lieu of a paper copy and is hereby incorporated by reference into the specification. The name of the text file containing the sequence listing is 2452-PSUSPNP_Seq_List_Revised_20230123_ST25.txt. The text file is 5 KB; was created on Jan. 23, 2023, contains no new matter, and is being submitted via Patent Center.

FIELD OF THE INVENTION

The present invention relates to peptides for use in the treatment of metabolic disorders. In particular, the present invention relates to peptides for use in the treatment of diabetes.

BACKGROUND OF THE INVENTION

The pathophysiology of both major forms of diabetes mellitus, type 1 and type 2 (T1DM and T2DM, respectively), is closely associated with loss of beta-cell mass and function. For T1DM, this is considered a result of a beta-cell-specific autoimmune process. For T2DM, unquestionably the most prevalent form of the disease, beta-cell loss is related to either apoptosis, or an insulin secretory deficiency in direct response to cellular stress or excessive workload. Accordingly, new therapeutic approaches that can prevent or reverse beta-cell dysfunction in diabetes are of considerable interest.

Several recent studies reveal that a peptide hormone secreted from the same intestinal L-cell as GLP-1, namely Peptide Tyrosine Tyrosine (PYY), possesses encouraging direct beneficial effects on beta-cell proliferation and protection against apoptosis. Indeed, a recent study has highlighted that remission of type 2 diabetes following bariatric surgery, known to dramatically improve beta-cell function, is accompanied by important elevations in circulating levels of PYY. Moreover, PYY also induces beta-cell rest, which has been shown to improve beta-cell function and protect against beta-cell loss in its own right.

Clinically-approved GLP-1 receptor agonists are reputed to possess beta-cell sparing properties, such as stimulating beta-cell proliferation, increasing beta-cell neogenesis, and inhibiting beta-cell apoptosis, in addition to their primary action of glucose-dependent insulin secretion. However, despite the vigour with which GLP-1 receptor agonists have been adopted into the clinic, enhancement of metabolic control is not as impressive as first hoped. Therefore, new agents that preserve or replenish beta-cell mass and function either alone, or in combination with GLP-1 therapy, would be extremely favourable.

SUMMARY OF THE INVENTION

According to a first aspect of the present invention, there is provided a peptide for use in the treatment of a metabolic disorder; wherein the peptide comprises Peptide Tyrosine Tyrosine (PYY).

The present invention therefore provides a peptide for use in the treatment of a metabolic disorder; wherein the peptide is PYY. The present invention therefore provides PYY for use in the treatment of a metabolic disorder. The present invention also provides a composition comprising PYY for use in the treatment of a metabolic disorder.

A second aspect of the present invention provides use of a peptide for the manufacture of a medicament for the treatment of a metabolic disorder; wherein the peptide comprises PYY. The present invention also provides use of a peptide for the manufacture of a medicament for the treatment of a metabolic disorder; wherein the peptide is PYY. The present invention also provides use of PYY for the manufacture of a medicament for the treatment of a metabolic disorder.

A third aspect of the present invention provides a method of treating a metabolic disorder, the method comprising administering a peptide; wherein the peptide comprises PYY. The present invention therefore provides a method of treating a metabolic disorder, the method comprising administering a peptide; wherein the peptide is PYY. The present invention also provides a method of treating a metabolic disorder, the method comprising administering PYY.

Optionally, the method comprises administering PYY to a subject. Further optionally, the method comprises administering PYY to a subject in need thereof. Still further optionally, the method comprises administering PYY to a subject suffering from a metabolic disorder.

Optionally, the method comprises administering a therapeutically effective amount of PYY. Further optionally, the method comprises administering a therapeutically effective amount of PYY to a subject. Further optionally, the method comprises administering a therapeutically effective amount of PYY to a subject in need thereof. Still further optionally, the method comprises administering a therapeutically effective amount of PYY to a subject suffering from a metabolic disorder.

Optionally, the peptide comprises piscine-derived PYY. Further optionally, the peptide is piscine-derived PYY.

Optionally, the peptide is human PYY. Further optionally, the peptide is human PYY(1-36).

Optionally, the peptide is piscine PYY. Further optionally, the peptide is selected from bowfin PYY, trout PYY, sea lamprey PYY, and sturgeon PYY. Further optionally, the peptide is sea lamprey PYY.

Optionally, the peptide comprises the amino acid sequence defined by SEQ ID NO: 1. Further optionally, the peptide has the amino acid sequence defined by SEQ ID NO: 1, or a fragment or analogue thereof.

Optionally, the peptide comprises the amino acid sequence defined by SEQ ID NO: 2. Further optionally, the peptide has the amino acid sequence defined by SEQ ID NO: 2, or a fragment or analogue thereof.

Optionally, the peptide comprises the amino acid sequence defined by SEQ ID NO: 3. Further optionally, the peptide has the amino acid sequence defined by SEQ ID NO: 3, or a fragment or analogue thereof.

Optionally, the N-terminal part of the peptide comprises an amino acid sequence defined by any one of SEQ ID NO: 1, SEQ ID NO: 2 or SEQ ID NO: 3, or a fragment or analogue each thereof. Further optionally, the N-terminus of the peptide comprises an amino acid sequence defined by any one of SEQ ID NO: 1, SEQ ID NO: 2, or SEQ ID NO: 3, or a fragment or analogue each thereof. Further optionally, the N-terminal part of the peptide comprises an amino acid sequence defined by any one of SEQ ID NO: 1, SEQ ID NO: 2 or SEQ ID NO: 3, or a fragment or analogue each thereof. Further optionally, the N-terminus of the peptide comprises an amino acid sequence defined by any one of SEQ ID NO: 1, SEQ ID NO: 2, or SEQ ID NO: 3, or a fragment or analogue each thereof.

Optionally, the peptide comprises the amino acid sequence defined by SEQ ID NO: 4. Further optionally, the peptide has the amino acid sequence defined by SEQ ID NO: 4, or a fragment or analogue thereof. Preferably, the peptide comprises the amino acid sequence defined by SEQ ID NO: 4. Further preferably, the peptide has the amino acid sequence defined by SEQ ID NO: 4, or a fragment or analogue thereof.

Optionally, the peptide comprises the amino acid sequence defined by SEQ ID NO: 5. Further optionally, the peptide has the amino acid sequence defined by SEQ ID NO: 5, or a fragment or analogue thereof.

Optionally, the peptide comprises the amino acid sequence defined by SEQ ID NO: 6. Further optionally, the peptide has the amino acid sequence defined by SEQ ID NO: 6, or a fragment or analogue thereof.

Optionally, the peptide comprises the amino acid sequence defined by SEQ ID NO: 7. Further optionally, the peptide has the amino acid sequence defined by SEQ ID NO: 7, or a fragment or analogue thereof.

Optionally, the peptide comprises the amino acid sequence defined by SEQ ID NO: 8. Further optionally, the peptide has the amino acid sequence defined by SEQ ID NO: 8, or a fragment or analogue thereof.

Optionally, an analogue has at least 60% sequence identity to the amino acid sequence of the peptide. Further optionally, an analogue has at least 70% sequence identity to the amino acid sequence of the peptide. Further optionally, an analogue has at least 80% sequence identity to the amino acid sequence of the peptide. Further optionally, an analogue has at least 90% sequence identity to the amino acid sequence of the peptide. Further optionally, an analogue has at least 95% sequence identity to the amino acid sequence of the peptide.

Optionally, the peptide comprises an amino acid sequence having at least 60% sequence identity to an amino acid sequence defined by any one of SEQ ID NO: 4, SEQ ID NO: 5, SEQ ID NO: 6, SEQ ID NO: 7, or SEQ ID NO: 8. Further optionally, the peptide comprises an amino acid sequence having at least 70% sequence identity to an amino acid sequence defined by any one of SEQ ID NO: 4, SEQ ID NO: 5, SEQ ID NO: 6, SEQ ID NO: 7, or SEQ ID NO: 8. Further optionally, the peptide comprises an amino acid sequence having at least 80% sequence identity to an amino acid sequence defined by any one of SEQ ID NO: 4, SEQ ID NO: 5, SEQ ID NO: 6, SEQ ID NO: 7, or SEQ ID NO: 8. Further optionally, the peptide comprises an amino acid sequence having at least 90% sequence identity to an amino acid sequence defined by any one of SEQ ID NO: 4, SEQ ID NO: 5, SEQ ID NO: 6, SEQ ID NO: 7, or SEQ ID NO: 8. Further optionally, the peptide comprises an amino acid sequence having at least 95% sequence identity to an amino acid sequence defined by any one of SEQ ID NO: 4, SEQ ID NO: 5, SEQ ID NO: 6, SEQ ID NO: 7, or SEQ ID NO: 8.

Optionally, the peptide comprises the amino acid sequence defined by any one of: SEQ ID NO: 4, SEQ ID NO:5, SEQ ID NO:6, SEQ ID NO:7, or SEQ ID NO:8.

Optionally, the analogue comprises at least one amino acid substitution or modification.

Optionally, the peptide analogue comprises the amino acid sequence defined by any one of: SEQ ID NO: 4, SEQ ID NO:5, SEQ ID NO: 6, SEQ ID NO:7, or SEQ ID NO:8; and at least one amino acid substitution or modification.

Optionally, the at least one amino acid substitution or modification is selected from:
(a) substitution or modification at position 1;
(b) substitution or modification at position 2;
(c) substitution or modification at position 3;
(d) substitution or modification at position 35; and
(e) substitution or modification at position 36.

Further optionally, the at least one amino acid substitution or modification is selected from:
(a) modification at position 1;
(b) modification at position 2;
(c) substitution at position 3; and
(d) substitution or modification at position 35; and
(e) modification at position 36.

Optionally, the modification at position 1 is deletion of the amino acid at position 1.

Optionally, the modification at position 2 is deletion of the amino acid at position 2.

Optionally, the substitution at position 3 is substitution of the amino acid at position 3 for an amino acid selected from alanine, isoleucine, leucine, methionine, phenylalanine, valine, proline, and glycine.

Preferably, the substitution at position 3 is substitution of the amino acid at position 3 for isoleucine.

Optionally, the substitution at position 35 is substitution of the amino acid at position 35 for an amino acid selected from D-arginine, lysine, aspartic acid, and glutamic acid.

Preferably, the substitution at position 35 is substitution of the amino acid at position 35 for D-arginine.

Optionally, the modification at position 35 is deletion of the amino acid at position 35.

Optionally, the modification at position 36 is deletion of the amino acid at position 36.

Optionally, the analogue comprises at least one amino acid substitution or modification selected from:
(a) deletion of the amino acid at position 1; and
(b) deletion of the amino acid at position 2.

Optionally, the analogue comprises at least one amino acid substitution or modification selected from:
(a) deletion of the amino acid at position 35; and
(b) deletion of the amino acid at position 36.

Optionally, the analogue comprises at least one amino acid substitution or modification selected from:
(a) deletion of the amino acid at position 1;
(b) deletion of the amino acid at position 2;
(c) deletion of the amino acid at position 35; and
(d) deletion of the amino acid at position 36.

Optionally, the analogue comprises at least one amino acid substitution or modification selected from:
(a) deletion of the amino acid at position 1;
(b) deletion of the amino acid at position 2;
(c) deletion of the amino acid at position 35; and
(d) deletion of the amino acid at position 36.

Optionally, the analogue comprises at least one amino acid substitution or modification selected from:
(a) deletion of the amino acid at position 1;
(b) deletion of the amino acid at position 2; and
(c) substitution of the amino acid at position 3 for isoleucine.

Optionally, the analogue comprises at least one amino acid substitution or modification selected from:
(a) substitution of the amino acid at position 3 for isoleucine;
(b) deletion of the amino acid at position 35; and
(c) deletion of the amino acid at position 36.

Optionally, the analogue comprises substitution of the amino acid at position 35 for D-arginine.

Optionally, the analogue comprises at least one amino acid substitution or modification selected from:
(a) substitution of the amino acid at position 3 for isoleucine; and
(b) substitution of the amino acid at position 35 for D-arginine.

Optionally, the analogue comprises at least one amino acid substitution or modification selected from:
(a) deletion of the amino acid at position 1;
(b) deletion of the amino acid at position 2;
(c) substitution of the amino acid at position 3 for isoleucine; and
(d) substitution of the amino acid at position 35 for D-arginine.

Optionally, the use or method comprises administering a dose of 0.25-25 nmol/kg bodyweight of the peptide, analogue or fragment. Further optionally, the use or method comprises administering a dose of 0.25, 2.5, 12.5, or 25 nmol/kg bodyweight of the peptide, analogue or fragment. Further optionally, the use or method comprises administering a dose of 25 nmol/kg bodyweight of the peptide, analogue or fragment.

Optionally, the use or method further comprises administration of glucose. Further optionally, the use or method further comprises administration of 16.7 mM glucose.

Optionally, the glucose is administered before the peptide.

Optionally or additionally, the glucose is co-administered with the peptide.

Optionally or additionally, the glucose is administered after the peptide.

Optionally, the use of the peptide in the treatment of a metabolic disorder has no significant impact on patient appetite. Optionally, the use of the peptide in the treatment of a metabolic disorder has no significant impact on patient appetite, compared to a comparable dose of human PYY(1-36). Optionally, the use of the peptide in the treatment of a metabolic disorder at a dose of 25 nmol/kg bodyweight has no significant impact on patient appetite, compared to the same or comparable dose of human PYY(1-36).

Optionally, the use of the peptide in the treatment of a metabolic disorder has no significant impact on patient appetite control. Further optionally, the use of the peptide in the treatment of a metabolic disorder does not adversely affect patient appetite control.

The present invention also provides the peptide for use in the treatment of the metabolic disorder; wherein the peptide comprises PYY; and wherein such use of the peptide has no significant impact on patient appetite.

The present invention also provides use of the peptide for the manufacture of a medicament for treatment of the metabolic disorder; wherein the peptide comprises PYY; and wherein administration of the medicament has no significant impact on patient appetite.

The present invention also provides a method of treatment of the metabolic disorder by administration of the peptide; wherein the peptide comprises PYY; and wherein the treatment has no significant impact on patient appetite.

Optionally, the peptide is enzymatically stable. Optionally, the peptide is at least partially resistant to cleavage and/or degradation by DPP-4. Optionally, the peptide is resistant to cleavage and/or degradation by DPP-4.

Optionally, the peptide has a half life of greater than 2 hours. Optionally, the peptide has a half life of greater than 2 hours under physiological conditions. Optionally, the peptide has a half life of greater than 2 hours when incubated with plasma; optionally murine plasma, alternatively human plasma. Optionally, the peptide has a half life of greater than 2 hours against cleavage and/or degradation by DPP-4. Further optionally, the peptide has a half life of greater than 2 hours against cleavage and/or degradation by DPP-4 when incubated with plasma; optionally murine plasma, alternatively human plasma. Optionally or additionally, the peptide has a half life of greater than 2 hours against cleavage and/or degradation by DPP-4 under physiological conditions. Optionally, the peptide has a half life of greater than 2 hours against cleavage and/or degradation by C-terminally directed protease enzymes. Further optionally, the peptide has a half life of greater than 2 hours against cleavage and/or degradation by C-terminally directed protease enzymes when incubated with plasma; optionally murine plasma, alternatively human plasma. Optionally or additionally, the peptide has a half life of greater than 2 hours against cleavage and/or degradation by C-terminally directed protease enzymes under physiological conditions. Optionally, the peptide has a half life of greater than 2 hours against cleavage and/or degradation by DPP-4 or C-terminally directed protease enzymes. Further optionally, the peptide has a half life of greater than 2 hours against cleavage and/or degradation by DPP-4 or C-terminally directed protease enzymes when incubated with plasma; optionally murine plasma, alternatively human plasma. Optionally or additionally, the peptide has a half life of greater than 2 hours against cleavage and/or degradation by DPP-4 or C-terminally directed protease enzymes under physiological conditions. Optionally, the peptide has a half life of greater than 2 hours against cleavage and/or degradation by DPP-4 and C-terminally directed protease enzymes. Further optionally, the peptide has a half life of greater than 2 hours against cleavage and/or degradation by DPP-4 and C-terminally directed protease enzymes when incubated with plasma; optionally murine plasma, alternatively human plasma. Optionally or additionally, the peptide has a half life of greater than 2 hours against cleavage and/or degradation by DPP-4 and C-terminally directed protease enzymes under physiological conditions.

Optionally, the peptide has a half life of at least 8 hours. Optionally, the peptide has a half life of at least 8 hours under physiological conditions. Optionally, the peptide has a half life of at least 8 hours when incubated with plasma; optionally murine plasma, alternatively human plasma. Optionally, the peptide has a half life of at least 8 hours against cleavage and/or degradation by DPP-4. Further optionally, the peptide has a half life of at least 8 hours against cleavage and/or degradation by DPP-4 when incubated with plasma; optionally murine plasma, alternatively human plasma. Optionally or additionally, the peptide has a half life of at least 8 hours against cleavage and/or degradation by DPP-4 under physiological conditions. Optionally, the peptide has a half life of at least 8 hours against cleavage and/or degradation by C-terminally directed protease enzymes. Further optionally, the peptide has a half life of at least 8 hours against cleavage and/or degradation by C-terminally directed protease enzymes when incubated with plasma; optionally murine plasma, alternatively human plasma. Optionally or additionally, the peptide has a half life of at least 8 hours against cleavage and/or degradation by C-terminally directed protease enzymes under physiological conditions. Optionally, the peptide has a half life of at least 8 hours against cleavage and/or degradation by DPP-4 or C-terminally directed protease enzymes. Further optionally, the peptide has a half life of at least 8 hours against cleavage and/or degradation by DPP-4 or C-terminally directed protease enzymes when incubated with plasma; optionally murine plasma, alternatively human plasma. Optionally or additionally, the peptide has a half life of at least 8 hours against cleavage and/or degradation by DPP-4 or C-terminally directed protease enzymes under physiological conditions. Optionally, the peptide has a half life of at least 8 hours against cleavage and/or degradation by DPP-4 and C-terminally directed protease enzymes. Further optionally, the peptide has a half life of at least 8 hours against cleavage and/or degradation by DPP-4 and C-terminally directed protease enzymes when incubated with plasma; optionally murine plasma, alternatively human plasma. Optionally or additionally, the peptide has a half life of at least 8 hours against cleavage and/or degradation by DPP-4 and C-terminally directed protease enzymes under physiological conditions.

Optionally, at least one terminus of the peptide is protected from enzymatic breakdown. Optionally, both termini of the peptide are protected from enzymatic breakdown. Optionally, at least one terminus, or both termini, of the peptide is protected from enzymatic breakdown. Optionally, the N-terminus of the peptide is protected from enzymatic breakdown. Optionally, the C-terminus of the peptide is protected from enzymatic breakdown. Optionally, both the N-terminus and C-terminus of the peptide are protected from enzymatic breakdown.

Optionally, at least one terminus of the peptide is protected from enzymatic breakdown under physiological conditions. Optionally, the N-terminus of the peptide is protected from enzymatic breakdown under physiological conditions. Optionally, the C-terminus of the peptide is protected from enzymatic breakdown under physiological conditions. Optionally, both the N-terminus and C-terminus of the peptide are protected from enzymatic breakdown under physiological conditions.

Optionally, at least one terminus of the peptide is protected from enzymatic breakdown by enzymes present in plasma. Optionally, the N-terminus of the peptide is protected from enzymatic breakdown by enzymes present in plasma. Optionally, the C-terminus of the peptide is protected from enzymatic breakdown by enzymes present in plasma. Optionally, both the N-terminus and C-terminus of the peptide are protected from enzymatic breakdown by enzymes present in plasma.

Optionally, at least one terminus of the peptide is protected from enzymatic breakdown by enzymes present in murine plasma. Optionally, the N-terminus of the peptide is protected from enzymatic breakdown by enzymes present in murine plasma. Optionally, the C-terminus of the peptide is protected from enzymatic breakdown by enzymes present in murine plasma. Optionally, both the N-terminus and C-terminus of the peptide are protected from enzymatic breakdown by enzymes present in murine plasma.

Optionally, at least one terminus of the peptide is protected from enzymatic breakdown by enzymes present in human plasma. Optionally, the N-terminus of the peptide is protected from enzymatic breakdown by enzymes present in human plasma. Optionally, the C-terminus of the peptide is protected from enzymatic breakdown by enzymes present in human plasma. Optionally, both the N-terminus and C-terminus of the peptide are protected from enzymatic breakdown by enzymes present in human plasma.

Optionally, at least one terminus of the peptide is protected from enzymatic breakdown by DPP-4. Optionally, the N-terminus of the peptide is protected from enzymatic breakdown by DPP-4. Optionally, the C-terminus of the peptide is protected from enzymatic breakdown by C-terminally directed protease enzymes. Optionally, both the N-terminus and C-terminus of the peptide are protected from enzymatic breakdown by DPP-4 and/or C-terminally directed protease enzymes.

Optionally, at least one terminus of the peptide is protected from enzymatic breakdown by DPP-4 or C-terminally directed protease enzymes under physiological conditions. Optionally, the N-terminus of the peptide is protected from enzymatic breakdown by DPP-4 under physiological conditions. Optionally, the C-terminus of the peptide is protected from enzymatic breakdown by C-terminally directed protease enzymes under physiological conditions. Optionally, both the N-terminus and C-terminus of the peptide are protected from enzymatic breakdown by DPP-4 and/or C-terminally directed protease enzymes under physiological conditions.

Optionally, the peptide is capable of beta-cell protective action in the body. Further optionally, the beta-cell protective action of the peptide is beneficial for use in the treatment of the metabolic disorder.

Optionally, the peptide is capable of inducing beta-cell rest in the body. Further optionally, the beta-cell rest induced by the peptide is beneficial for use in the treatment of the metabolic disorder.

Optionally, the peptide is capable of increasing beta-cell proliferation in the body. Further optionally, the increased beta-cell proliferation caused by the peptide is beneficial for use in the treatment of the metabolic disorder.

Optionally, the peptide is capable of reducing beta-cell apoptosis in the body. Further optionally, the reduced beta-cell apoptosis caused by the peptide is beneficial for use in the treatment of the metabolic disorder.

Optionally, the peptide is capable of decreasing beta-cell proliferation in the body. Further optionally, the decreased beta-cell proliferation caused by the peptide is beneficial for use in the treatment of the metabolic disorder.

Optionally, the peptide is capable of increasing beta-cell apoptosis in the body. Further optionally, the increased beta-cell apoptosis caused by the peptide is beneficial for use in the treatment of the metabolic disorder.

Optionally, the peptide is capable of activating at least one Neuropeptide Y receptor in the body. Further optionally, Neuropeptide Y receptor activation by the peptide is beneficial for use in the treatment of the metabolic disorder. Optionally, the at least one Neuropeptide Y receptor is a $Y_1$ receptor. Optionally, the or each $Y_1$ receptor is a pancreatic $Y_1$ receptor. Optionally, the at least one Neuropeptide Y receptor is a $Y_2$ receptor. Optionally, the or each $Y_2$ receptor is a hypothalamic $Y_2$ receptor.

Optionally, the use or method comprises at least one dose administration daily. Further optionally, the use or method comprises at least two dose administrations daily. Further optionally, the use or method comprises two dose administrations daily.

Optionally, the use or method comprises dose administration daily for at least one day. Further optionally, the use or method comprises dose administration daily for at least two consecutive days. Further optionally, the use or method comprises dose administration daily for at least three consecutive days. Further optionally, the use or method comprises dose administration daily for at least four consecutive days. Further optionally, the use or method comprises dose administration daily for at least five consecutive days. Further optionally, the use or method comprises dose administration daily for at least six consecutive days. Further optionally, the use or method comprises dose administration daily for at least seven consecutive days. Further optionally, the use or method comprises dose administration daily for at least fourteen consecutive days. Further optionally, the use or method comprises dose administration daily for at least twenty-one consecutive days.

Optionally, the use or method comprises periodic administration of the peptide. Further optionally, the use or method comprises periodic administration of the peptide in 24 hour cycles. Optionally, the use or method comprises administration of the peptide during the night. Optionally, the use or method comprises administration of the peptide within a pre-determined period of time before or while the patient is asleep. Optionally, night refers to the period between dawn and dusk.

Optionally, the use or method comprises at least one administration of the peptide during a pre-determined first period during every pre-determined second period. Optionally, the duration of the second period is longer than the duration of the first period. Optionally, the duration of the second period is 24 hours. Optionally, the use or method comprises at least one administration of the peptide during a pre-determined first period during every 24 hours. Optionally, the duration of the first period is 8-12 hours long. Further optionally, the first period is of a duration selected from the group comprising: 4, 5, 6, 7, 8, 9, 10, 11, 12, 13, 14, 15, or 16 hours. Optionally, the first period is recurring. Optionally, the first period recurs every 24 hours.

Optionally, the first period falls during the night. Optionally, the first period falls at a time that includes midnight. Optionally, the first period includes a time of day selected from the group comprising: 18:00, 19:00, 20:00, 21:00, 22:00, 23:00, 00:00, 01:00, 02:00, 03:00, 04:00, 05:00, 06:00, 07:00, 08:00, or 09:00. Optionally, the first period falls at a time of day that includes a time selected from the group comprising: 6 pm, 7 pm, 8 pm, 9 pm, 10 pm, 11 pm, 12 midnight, 1 am, 2 am, 3 am, 4 am, 5 am, 6 am, 7 am, 8 am, or 9 am.

Optionally, the first period comprises an 8-hour period from 18:00-02:00. Further optionally, the first period comprises an 8-hour period from 19:00-03:00. Further optionally, the first period comprises an 8-hour period from 20:00-04:00. Further optionally, the first period comprises an 8-hour period from 21:00-05:00. Further optionally, the first period comprises an 8-hour period from 22:00-06:00. Further optionally, the first period comprises an 8-hour period from 23:00-07:00. Further optionally, the first period comprises an 8-hour period from 00:00-08:00. Further optionally, the first period comprises an 8-hour period from 01:00-09:00.

Optionally, the first period comprises a 9-hour period from 18:00-03:00. Further optionally, the first period comprises a 9-hour period from 19:00-04:00. Further optionally, the first period comprises a 9-hour period from 20:00-05:00. Further optionally, the first period comprises a 9-hour period from 21:00-06:00. Further optionally, the first period comprises a 9-hour period from 22:00-07:00. Further optionally, the first period comprises a 9-hour period from 23:00-08:00. Further optionally, the first period comprises a 9-hour period from 00:00-09:00. Further optionally, the first period comprises a 9-hour period from 01:00-10:00.

Optionally, the first period comprises a 10-hour period from 18:00-04:00. Further optionally, the first period comprises a 10-hour period from 19:00-05:00. Further optionally, the first period comprises a 10-hour period from 20:00-06:00. Further optionally, the first period comprises a 10-hour period from 21:00-07:00. Further optionally, the first period comprises a 10-hour period from 22:00-08:00. Further optionally, the first period comprises a 10-hour period from 23:00-09:00. Further optionally, the first period comprises a 10-hour period from 00:00-10:00. Further optionally, the first period comprises a 10-hour period from 01:00-11:00.

Optionally, the first period comprises an 11-hour period from 18:00-05:00. Further optionally, the first period comprises an 11-hour period from 19:00-06:00. Further optionally, the first period comprises an 11-hour period from 20:00-07:00. Further optionally, the first period comprises an 11-hour period from 21:00-08:00. Further optionally, the first period comprises an 11-hour period from 22:00-09:00. Further optionally, the first period comprises an 11-hour period from 23:00-10:00. Further optionally, the first period comprises an 11-hour period from 00:00-11:00. Further optionally, the first period comprises an 11-hour period from 01:00-12:00.

Optionally, the first period comprises a 12-hour period from 18:00-06:00. Further optionally, the first period comprises a 12-hour period from 19:00-07:00. Further optionally, the first period comprises a 12-hour period from 20:00-08:00. Further optionally, the first period comprises a 12-hour period from 21:00-09:00. Further optionally, the first period comprises a 12-hour period from 22:00-10:00. Further optionally, the first period comprises a 12-hour period from 23:00-11:00. Further optionally, the first period comprises a 12-hour period from 00:00-12:00. Further optionally, the first period comprises a 12-hour period from 01:00-13:00.

Optionally, the use or method comprises administration of the peptide in alternating combination with at least one other compound. Optionally, the use or method comprises administration of the peptide in alternating combination with at least one other specific compound. Optionally, the use or method comprises administration of the peptide in alternating combination with at least one GLP-1 receptor agonist. Optionally, the use or method comprises periodic administration of the peptide in alternating combination with at least one GLP-1 receptor agonist. Optionally, the use or method comprises periodic alternate administration of the peptide in alternating combination with periodic administration of at least one GLP-1 receptor agonist.

Optionally, the use or method comprises alternating periodic administration of the peptide, alternating with administration of another compound. Optionally, the use or method comprises alternating periodic administration of the peptide, alternating with administration of another specific compound. Further optionally, the use or method comprises alternating periodic administration of the peptide, alternating with administration of at least one GLP-1 receptor agonist.

Optionally, the use or method comprises at least one administration of the peptide during the night and at least one administration of at least one GLP-1 receptor agonist during the day. Optionally, the use or method comprises at least one administration of the peptide within a pre-determined period of time before or while the patient is asleep; and at least one administration of at least one GLP-1 receptor agonist while the patient is awake.

Optionally, the use or method further comprises at least one administration of at least one GLP-1 receptor agonist during a pre-determined third period during every pre-determined second period. Optionally, the duration of the second period is longer than the duration of the third period.

Optionally, the third period falls during the day. Optionally, the third period falls at a time that includes noon. Optionally, the third period includes a time of day selected from the group comprising: 06:00, 07:00, 08:00, 09:00, 10:00, 11:00, 12:00, 13:00, 14:00, 15:00, 16:00, 17:00, 18:00, 19:00, 20:00, or 21:00. Optionally, the third period falls at a time of day that includes a time selected from the group comprising: 6 am, 7 am, 8 am, 9 am, 10 am, 11 am, 12 noon, 1 pm, 2 pm, 3 pm, 4 pm, 5 pm, 6 pm, 7 pm, 8 pm, or 9 pm.

Further optionally, the first period and third period alternate sequentially.

Optionally, the at least one GLP-1 receptor agonist is liraglutide, (sold under the trademarks Victoza or Saxenda).

Optionally, the at least one GLP-1 receptor agonist is exenatide, (sold under the trademarks Byetta or Bydureon).

Optionally, the metabolic disorder comprises a defect of insulin regulation. Optionally, the metabolic disorder comprises a defect of insulin production and/or a defect of insulin storage, and/or a defect of insulin release.

Optionally, the metabolic disorder is a pancreatic disorder. Optionally, the metabolic disorder is comprises a defect of the pancreatic beta cells.

Optionally, the metabolic disorder is diabetes, optionally diabetes mellitus.

Optionally, the diabetes comprises prediabetes. Optionally, the diabetes comprises latent autoimmune diabetes of adults. Optionally, the diabetes comprises maturity onset diabetes of the young.

Optionally, the diabetes mellitus is diabetes mellitus type 1. Optionally, the diabetes mellitus is diabetes mellitus type 2. Optionally, the diabetes mellitus is gestational diabetes mellitus. Optionally, the diabetes mellitus is malnutrition-related diabetes mellitus.

According to the present invention, there is also provided a peptide for use in the treatment of a metabolic disorder; wherein the peptide comprises piscine-derived PYY; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown under physiological conditions; and wherein the use comprises administration of the peptide within a pre-determined period of time before or while the patient is asleep; and wherein the metabolic disorder comprises diabetes mellitus.

According to the present invention, there is also provided a peptide for use in the treatment of a metabolic disorder; wherein the peptide comprises piscine-derived PYY; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown under physiological conditions; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises piscine-derived PYY; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown under physiological conditions; and wherein the use comprises administration of the peptide within a pre-determined period of time before or while the patient is asleep; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises piscine-derived PYY; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 under physiological conditions; and wherein the use comprises administration of the peptide within a pre-determined period of time before or while the patient is asleep; and wherein the metabolic disorder comprises diabetes mellitus.

According to the present invention, there is also provided a peptide for use in the treatment of a metabolic disorder; wherein the peptide comprises piscine-derived PYY; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 under physiological conditions; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises piscine-derived PYY; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 under physiological conditions; and wherein the use comprises administration of the peptide within a pre-determined period of time before or while the patient is asleep; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 1; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown under physiological conditions; and wherein the use comprises administration of the peptide within a pre-determined period of time before or while the patient is asleep; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 1; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown under physiological conditions; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 1; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown under physiological conditions; and wherein the use comprises administration of the peptide within a pre-determined period of time before or while the patient is asleep; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 1; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 under physiological conditions; and wherein the use comprises administration of the peptide within a pre-determined period of time before or while the patient is asleep; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 1; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 and/or C-terminally directed protease enzymes under physiological conditions; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 1; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 and/or C-terminally directed protease enzymes under physiological conditions; and wherein the use comprises administration of the peptide within a pre-determined period of time before or while the patient is asleep; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 2; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 and/or C-terminally directed protease enzymes under physiological conditions; and wherein the use comprises administration of the peptide within a pre-determined period of time before or while the patient is asleep; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 2; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 and/or C-terminally directed protease enzymes under physiological conditions; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 2; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 and/or C-terminally directed protease enzymes under physiological conditions; and wherein the use comprises administration of the peptide within a pre-determined period of time before or while the patient is asleep; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 2; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 and/or C-terminally directed protease enzymes under physiological conditions; and wherein the use comprises administration of the peptide within a pre-determined period of time before or while the patient is asleep; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 2; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 and/or C-terminally directed protease enzymes under physiological conditions; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 2; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 and/or C-terminally directed protease enzymes under physiological conditions; and wherein the use comprises administration of the peptide within a pre-determined period of time before or while the patient is asleep; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 3; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown under physiological conditions; and wherein the use comprises administration of the peptide within a pre-determined period of time before or while the patient is asleep; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 3; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown under physiological conditions; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 3; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown under physiological conditions; and wherein the use comprises administration of the peptide within a pre-determined period of time before or while the patient is asleep; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 3; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 and/or C-terminally directed protease enzymes under physiological conditions; and wherein the use comprises administration of the peptide within a pre-determined period of time before or while the patient is asleep; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 3; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 and/or C-terminally directed protease enzymes 4 under physiological conditions; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 3; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 and/or C-terminally directed protease enzymes under physiological conditions; and wherein the use comprises administration of the peptide within a pre-determined period of time before or while the patient is asleep; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 4; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown under physiological conditions; and wherein the use comprises administration of the peptide within a pre-determined period of time before or while the patient is asleep; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 4; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown under physiological conditions; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 4; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown under physiological conditions; and wherein the use comprises administration of the peptide within a pre-determined period of time before or while the patient is asleep; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 4; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 and/or C-terminally directed protease enzymes under physiological conditions; and wherein the use comprises administration of the peptide within a pre-determined period of time before or while the patient is asleep; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 4; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 and/or C-terminally directed protease enzymes under physiological conditions; and wherein the use comprises administration of the peptide in alternating combination with at least one GLP-1 receptor agonist; and wherein the metabolic disorder comprises diabetes mellitus.

According to the present invention, there is also provided a peptide for use in the treatment of a metabolic disorder; wherein the peptide comprises the amino acid sequence defined by SEQ ID NO: 4; and wherein the use of the peptide in the treatment of a metabolic disorder has no significant impact on patient appetite, compared to a comparable dose of human PYY(1-36); and wherein the peptide has a half life of at least 8 hours under physiological conditions; and wherein both the N-terminus and C-terminus of the peptide are protected from enzymatic breakdown by DPP-4 and/or C-terminally directed protease enzymes under physiological conditions; and wherein the use comprises administration of the peptide within a pre-determined period of time before or while the patient is asleep; and wherein the use comprises administration of the peptide in alternating combination with at least one GLP-1 receptor agonist; and wherein the metabolic disorder comprises diabetes mellitus.

The term PYY refers to the peptide named Peptide Tyrosine Tyrosine.

The term DPP-4 is synonymous with dipeptidyl peptidase-4 and/or adenosine deaminase complexing protein 2.

The term GLP-1 is synonymous with Glucagon-like peptide-1.

The term "Iso" is intended to be synonymous with the terms "Ile" and "Isoleucine".

Amino acid positions refer to the amino acid positions defined in the accompanying sequence listing. Specifically, amino acids positions refer to the amino acid positions defined by any one of: SEQ ID NO: 4, SEQ ID NO:5, SEQ ID NO:6, or SEQ ID NO:8 in the accompanying sequence listing. Amino acid positions referred to in this description refer to amino acid positions starting from amino acid position 2 (Phe) as defined by SEQ ID NO:7 in the accompanying sequence listing—i.e. amino acid position 1 referred to in this description refers to amino acid position 2 (Phe) as defined by SEQ ID NO: 7 in the accompanying sequence listing; amino acid position 2 referred to in this description refers to amino acid position 3 (Pro) as defined by SEQ ID NO:7 in the accompanying sequence listing; amino acid position 3 referred to in this description refers to amino acid position 4 (Pro) as defined by SEQ ID NO:7 in the accompanying sequence listing; amino acid position 4 referred to in this description refers to amino acid position 5 (Lys) as defined by SEQ ID NO:7 in the accompanying sequence listing; and so on.

BRIEF DESCRIPTION OF THE DRAWINGS

FIG. 2A shows a chart illustrating proliferation frequency of human 1.1B4 beta-cells (percent of total cells analysed) on the Y-axis against various treatments including human PYY(1-36) and four piscine-derived PYY variants. As shown by the key, each treatment was tested separately at $10^{-8}$ and $10^{-6}$ M. Values are mean±SEM (n=4). * p<0.05,  p<0.01, * p<0.001 compared to untreated media control. $^{\Delta}$p<0.05 compared to respective concentration of human PYY(1-36). FIG. 2B shows a chart illustrating TUNEL positive apoptotic cells of human 1.1B4 beta-cells (percent of total cells analysed) on the Y-axis against various treatments including human PYY (1-36) and four piscine-derived PYY variants on the X-axis. As shown by the key, each PYY peptide was tested separately at $10^{-8}$ and $10^{-6}$ M. Values are mean±SEM (n=4). * p<0.05,  p<0.01, * p<0.001 compared to untreated media control.

FIG. 6A shows a chart illustrating proliferation frequency in immortalised rodent BRIN-BD11 cells (percent of total cells analysed) on the Y-axis against various treatments including GLP-1, $PYY_{1-36}$, $PYY_{3-36}$, $PYY_{1-34}$, $PYY_{3-34}$. As shown by the key, each treatment was tested separately at $10^{-8}$ and $10^{-6}$ M. Values are mean±SEM (n=3).  p<0.01, * p<0.001 compared to untreated, media control. * p<0.05, *** p<0.001 compared to cytokine mixture alone. FIG. 6B shows a chart illustrating TUNEL positive apoptotic cells of human 1.1B4 cells (percent of total cells analysed) on the Y-axis against various treatments including GLP-1, $PYY_{1-36}$, $PYY_{3-36}$, $PYY_{1-34}$, $PYY_{3-34}$ on the X-axis. As shown by the key, each PYY peptide was tested separately at $10^{-8}$ and $10^{-6}$ M. Values are mean±SEM (n=4). * p<0.05, * p<0.001 compared to cytokine mixture alone.  p<0.01 compared to untreated, media control.

FIG. 7A shows a chart illustrating proliferation frequency in immortalised rodent BRIN-BD11 cells (percent of total cells analysed) on the Y-axis against various treatments including GLP-1, $PYY_{1-36}$, $PYY_{3-36}$, $PYY_{1-34}$, $PYY_{3-34}$. As shown by the key, each treatment was tested separately at $10^{-8}$ and $10^{-6}$ M. Values are mean±SEM (n=3). * p<0.05,  p<0.01, * p<0.001 compared to control. FIG. 7B shows a chart illustrating proliferation frequency in 1.1B4 cells (percent of total cells analysed) on the Y-axis against various treatments including GLP-1, $PYY_{1-36}$, $PYY_{3-36}$, $PYY_{1-34}$, $PYY_{3-34}$. As shown by the key, each treatment was tested separately at $10^{-8}$ and $10^{-6}$ M. Values are mean±SEM (n=3). * p<0.05,  p<0.01, * p<0.001 compared to control.

DETAILED DESCRIPTION OF THE INVENTION

Figure 1:
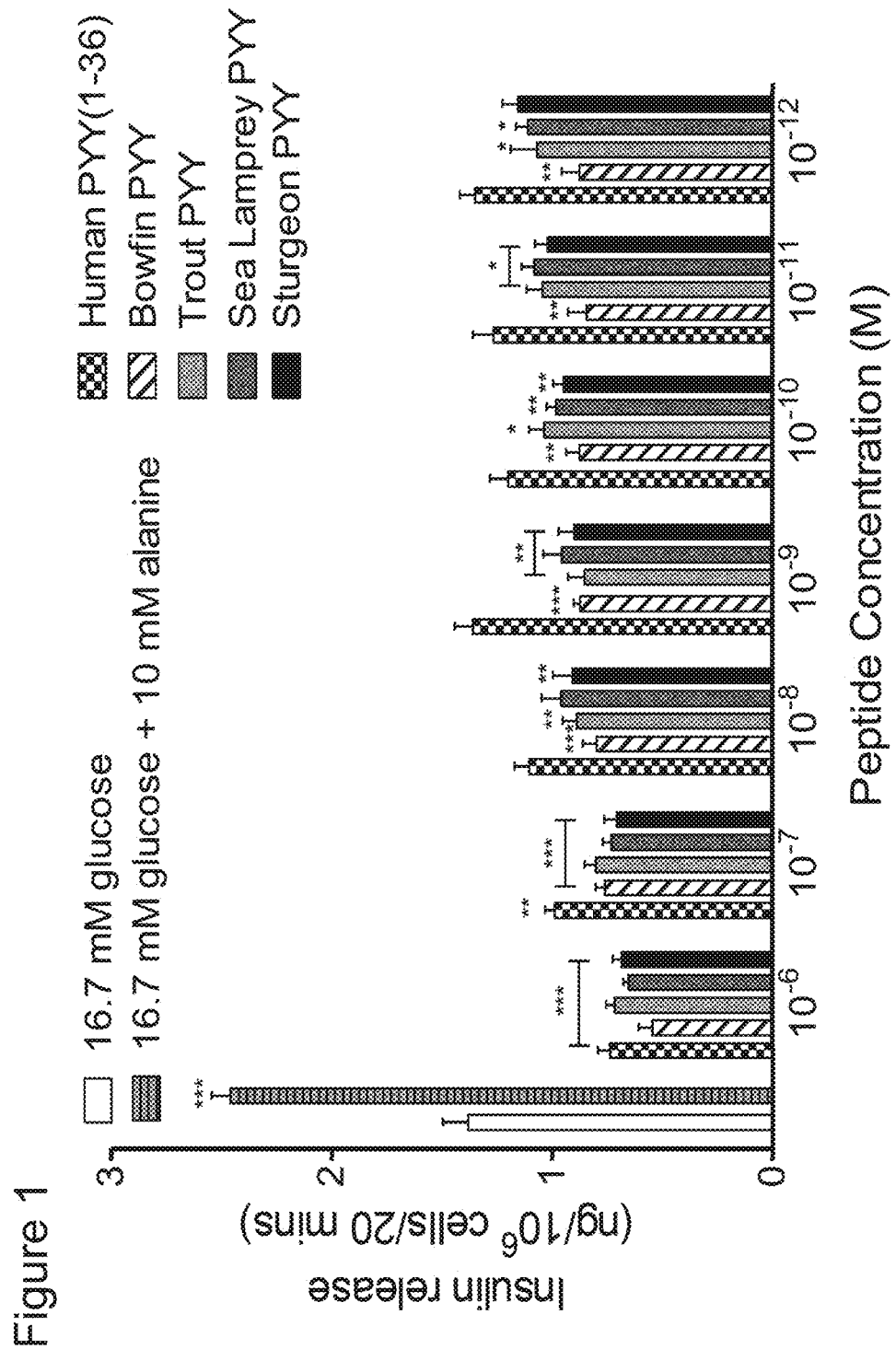
FIG. 1 shows a chart illustrating insulin release (ng/$10^6$ cells/20 minutes) from rodent BRIN-BD11 beta-cells on the Y-axis against the concentration of various peptides on the X-axis. The peptides include Human PYY(1-36), Bowfin PYY, Trout PYY, Sea Lamprey PYY, Sturgeon PYY, as shown by the key. Values are mean±SEM (n=8). * $p<0.05$,  $p<0.01$, * $p<0.001$ compared to 16.7 mM glucose control.

Beta-cell rest: Previous work by the inventors has already shown that sustained periods of beta-cell rest using a GIP receptor inhibitor, combined with suitable intervals of beta-cell stimulation with a GLP-1 agonist, has significant therapeutic potential for diabetes. In agreement, there is known to be a preservation of residual beta-cells in various diabetes conditions and, without being bound by theory, it is believed that inducing beta-cell rest offers a route for reactivating these cells, and preserving beta-cell function. As such, prolonged periods of rest are thought to allow chronically overstimulated beta-cells to replenish the immediately secretable insulin granule pool. Other positive actions known to occur during extended periods of beta-cell rest include enhanced beta-cell glucokinase activity and improved hepatic glucose handling. There is also a suggestion that beta-cell rest can directly impede beta-cell apoptosis. Moreover, the undetermined mechanism whereby thiazolidinediones exert a protective effect on beta-cell function has now been directly linked to beta-cell resting actions. Finally, a recent study has highlighted the plasticity of pancreatic beta-cells and their ability to correct inherent insulin secretory dysfunction through sustained periods of beta-cell rest. This gives further credence to the idea of sequential periods of beta-cell rest as a treatment strategy for diabetes.

GLP-1 and PYY: Like many gut peptides, both native GLP-1 and PYY are rapidly degraded by plasma enzymes, particularly dipeptidylpeptidase-4 (DPP-4). For GLP-1, this degradation annuls insulin secretory and protective beta-cell effects. As such, numerous enzymatically stable long-acting forms of GLP-1 are now clinically available. For PYY, the story is only just beginning to emerge. Until recently, the principal biological action of PYY was believed to be linked to induction of satiety and regulation of energy balance. This action is initiated by the enzymatic action of DPP-4 on PYY, cleaving native PYY(1-36) to PYY(3-36). Interestingly, these energy-regulating effects are believed to be exerted through interaction of PYY(3-36) with the neuropeptide Y (Y) receptors, specifically hypothalamic $Y_2$ receptors. However, more recent investigations are beginning to reveal a critical role for PYY(1-36) in the control of beta-cell function and survival, through activation of $Y_1$ receptors. Thus, PYY(3-36) is a more specific $Y_2$ receptor agonist, whereas PYY(1-36) is known to interact mainly with $Y_1$ receptors. Indeed, the $Y_1$ receptor is recognised as the most prominent NPY receptor form in the endocrine pancreas. This knowledge is further strengthened through demonstration that selective destruction of PYY-expressing cells in adult mice induces dysfunction and loss of beta-cells, and that transgenic mice selectively overexpressing PYY in pancreatic beta-cells present with increased beta-cell mass. Studies by the inventors, along with the recent evidence of PYY-mediated beneficial effects of Roux-en-Y gastric bypass surgery, suggest that sustained activation of $Y_1$ receptors by enzymatically stable PYY(1-36) analogues will exert clear benefits for diabetes treatment, linked to both induction of beta-cell rest and direct promotion of beta-cell survival.

Figure 2:
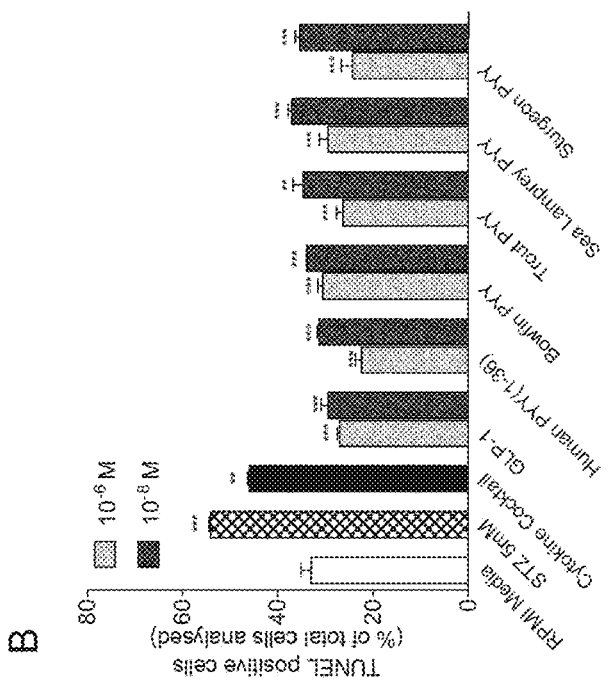
FIG. 2 includes two charts.
Figure 2:
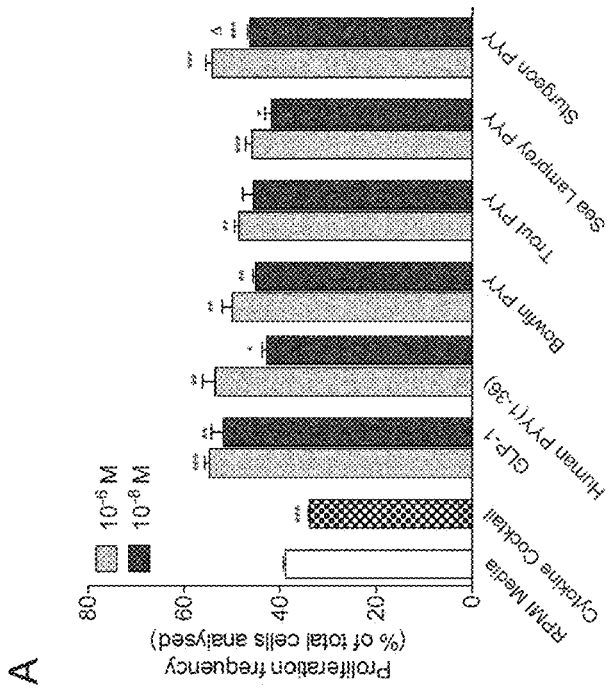
Figure 3:
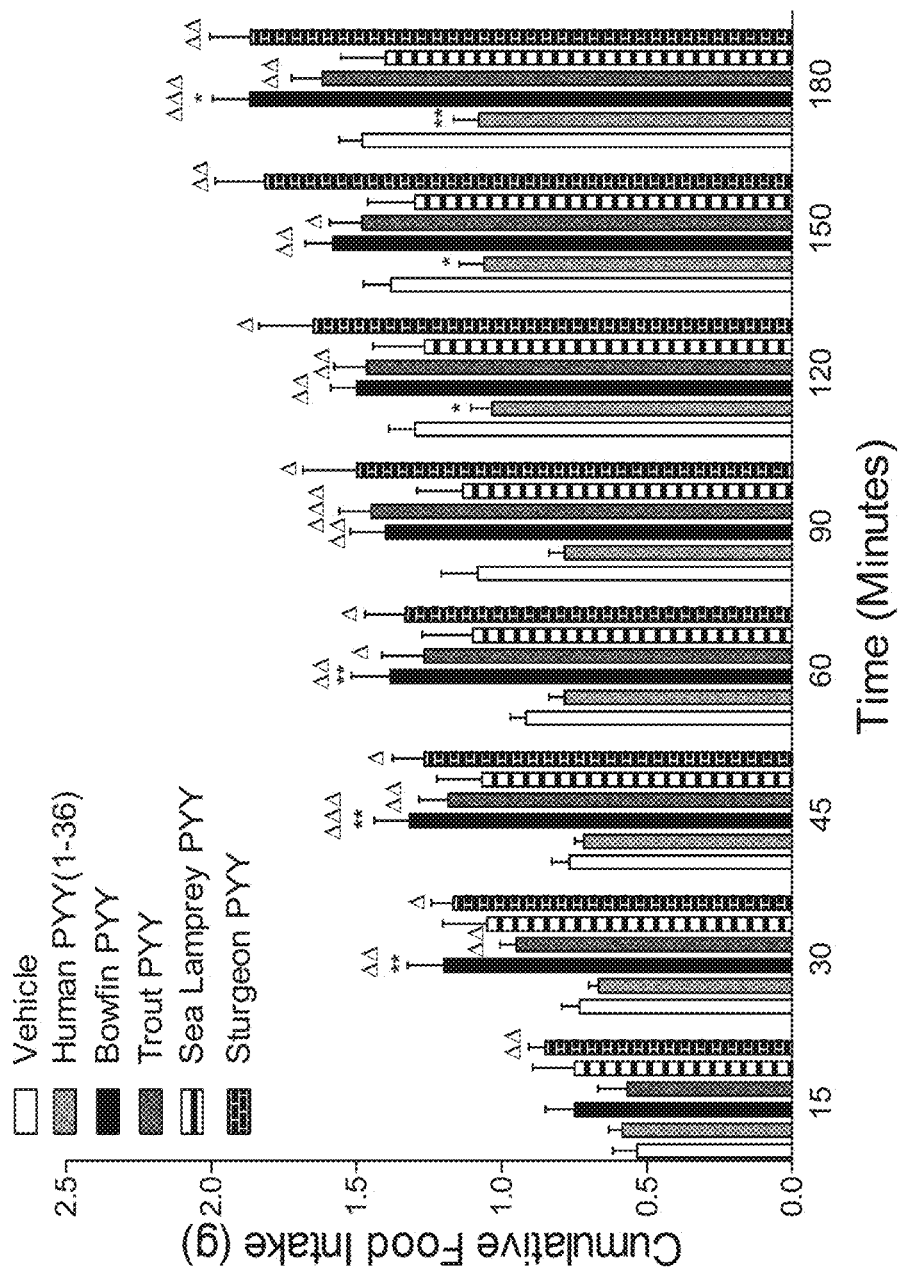
FIG. 3 shows a chart illustrating cumulative food intake (g) in overnight fasted mice on the Y-axis against time (minutes). As shown by the key, cumulative food intake was assessed following intraperitoneal administration of vehicle (0.9% NaCl) alone or in combination with test peptide (each at 25 nmol/kg bw). As shown by the key, test peptides included human PYY(1-36), Bowfin PYY, Trout PYY, Sea Lamprey PYY, Sturgeon PYY. Values are mean±SEM (n=6). * p<0.05, ** p<0.01 compared to vehicle treated control. $^{\Delta}$p<0.05, $^{\Delta\Delta}$p<0.01 $^{\Delta\Delta\Delta}$p<0.001 compared to human PYY(1-36).

Stable PYY and GLP-1 peptides: Numerous well-characterised GLP-1 receptor agonists are now available, including liraglutide. The major challenge for the current study in relation to GLP-1 involves timing of injections, relative to sequential PYY injections, to evoke maximum possible benefits. Harnessing PYY therapeutically is more challenging. As noted above, activation of $Y_1$ receptors by PYY(1-36) is key for direct beneficial beta-cell effects. Based on the origin and evolution of PYY, and therefore most prolonged conservation of sequence, the inventors have screened a series of piscine-derived PYY peptides for potential therapeutic exploitation. Thus, just as was the case for the clinically utilised GLP-1 receptor agonists, the inventors believe that nature could hold the key to uncovering the first-in-class, stable PYY peptide. The inventors were initially able to narrow down potential lead candidates based on computation structure/function analyses to yield stable, $Y_1$ receptor specific, PYY peptides. Thus, trout, bowfin, sturgeon and sea lamprey PYY forms were chosen for further analysis. Subsequent detailed pilot studies by the inventors revealed, as expected from structural analyses, all four peptides were enzymatically stable (Table 1). In addition, the piscine-derived PYY peptides also induced similar insulinostatic (FIG. 1), beta-cell proliferative and anti-apoptotic (FIG. 2) effects as human PYY, confirming retention of bioactivity, presumably through activation of pancreatic $Y_1$ receptors. It might be expected that activation of hypothalamic $Y_1$ receptors would stimulate hunger, whilst this was true for trout, bowfin and sturgeon PYY, sea lamprey PYY had no significant impact on appetite (FIG. 3). These observations make sea lamprey PYY the preferred lead candidate to have taken forward to efficacy testing in diabetes, alongside treatment with an established GLP-1 mimetic.

Exploiting sequential beta-cell rest and stimulation: GLP-1 and PYY possess complementary beneficial effects on the preservation of beta-cell mass. Since PYY evokes beta-cell rest, it is logical that treatment with PYY-based agents should be introduced at a time when the beta-cell is least active, that is, during sleeping hours. Indeed, it would be imagined that any potential stimulation of hypothalamic $Y_1$ receptors would have less potential impact on appetite at this time. In any case, the inventors do not see this as a major issue for sea lamprey PYY, based on the pilot observations (FIG. 3). Following on from this, activation of GLP-1 receptors during awake hours, when the beta-cell is more likely to be stimulated, is also contemplated. The inventors already have experience in this type of scenario in mice. Since a 12 hour dark: light cycle is standard procedure in rodent research facilities worldwide, the inventors have created a precise dosing schedule where beta-cells will be rested for 8-12 hours and then subsequently stimulated for 8-12 hours. In the human setting, the inventors recognise that these timings might need to be adapted, but the same theory applies. The staggered treatment scenario should also avoid any potential receptor downregulation and encourage preservation of beta-cell mass during the entire day, without adversely affecting insulin secretory function. Taken together, the potential interplay that exists between PYY and GLP-1 receptor signalling, enabling preservation and possible replenishment of beta-cell mass, promotes this approach as a new and effective treatment paradigm for diabetes.

EXAMPLES

Insulin Secretion Methodology

Effects of peptides on insulin secretion were examined using immortalised rodent BRIN-BD11 and human 1.1B4 beta-cells. Cells were seeded (150,000/well) into 24-well plates (Nunc, Roskilde, Denmark) and allowed to attach overnight at 37° C. Following 40 min pre-incubation (1.1 mmol/l glucose; 37° C.), cells were incubated (20 min; 37° C.) in the presence of 5.6 or 16.7 mmol/L glucose, as appropriate, with a range of test peptide concentrations as appropriate. After 20 min incubation, buffer was removed from each well and aliquots stored at −20° C. prior to determination of insulin by radioimmunoassay.

Beta-Cell Proliferation and Apoptosis Studies Methodology

To assess the effects of peptides on rodent BRIN-BD11 and human 1.1B4 cell proliferation, cells were seeded at a density of 150,000 cells per well and cultured overnight in the presence of peptides. Cells were rinsed with PBS and fixed using 4% paraformaldehyde. After antigen retrieval with citrate buffer at 95° C. for 20 min, tissue was blocked using 2% BSA for 45 min. The slides were then incubated with rabbit anti-Ki-67 primary antibody, and subsequently with Alexa Fluor® 594 secondary antibody. Slides were viewed using fluorescent microscope (Olympus System Microscope, model BX51; Southend-on-Sea, UK) and photographed by DP70 camera adapter system. Proliferation frequency was determined in a blinded fashion and expressed as % of total cells analysed. Approximately 150 cells per replicate were analysed. For analysis of ability to protect against apoptosis, BRIN-BD11 and 1.1B4 cells were seeded as above. Cells were then exposed to cytokine mixture, as described, in the presence or absence of test peptides for 2 h. Cells were then harvested and a TUNEL assay was performed. Slides were viewed under appropriate filter using an Olympus™ fluorescent microscope.

Food Intake Methodology

Studies were carried out using adult male NIH Swiss mice (12 weeks of age, Envigo Ltd, UK), housed individually in air conditioned room at 22±2° C. with 12 h light and dark cycle and ad libitum access to standard rodent diet (10% fat, 30% protein and 60% carbohydrate; Trouw Nutrition, Northwich, UK) and drinking water. All experiments were carried out in accordance with the UK Animal Scientific Procedures Act 1986. Mice were fasted (18 h) and then received an i.p. injection of saline alone (0.9% (w/v) NaCl) or in combination with test peptides (25 nmol/kg body weight) and food intake measured at 30 min intervals.

Example 1 Identification of Stable, Y1 Receptor Specific, PYY Peptides; and DPP-4 and Murine Plasma Degradation Analyses The inventors were initially able to narrow down potential lead candidates based on computation structure/function analyses to yield stable, $Y_1$ receptor specific, PYY peptides. Thus, trout, bowfin, sturgeon and sea lamprey PYY forms were chosen for further analysis.

Following incubation of peptides with purified DPP-4 or murine plasma and HPLC analysis, collected fractions for each time-point (0, 2 and 8 h) were subsequently mixed with α-cyano-4-hydroxycinnamic acid and applied to a Voyager-DE BioSpectrometry Workstation and mass-to-charge (m/z) ratio verses peak intensity recorded. The results are shown in Table 1.

TABLE 1

Amino acid sequence of PYY peptides, as well as DPP-4 and murine plasma degradation analyses

| Amino acid sequence | SEQ ID NO | Peptide | DPP-4 half-life | Plasma half-life |
|---|---|---|---|---|
| YPIKPEAPGEDASPEELNRYYASLRHYLNLVTRQRY-$NH_2$ | 8 | Human PYY(1-36) | <2 h | <2 h |
| YPPKPENPGEDAPPEELARYYSALRHYINLITRQRY-$NH_2$ | 5 | Bowfin PYY | >8 h | >8 h |
| YPPKPENPGEDAPPEELAKYYTALRHYINLITRQRY-$NH_2$ | 6 | Trout PYY | >8 h | >8 h |
| MPPKPDNPSPDASPEELSKYMLAVRNYINLITRQRY-$NH_2$ | 4 | Sea lamprey PYY | >8 h | >8 h |
| YFPPKPEHPGDDAPAEDVVKYYTALRHYINLITRQRY-$NH_2$ | 7 | Sturgeon PYY | >8 h | >8 h |

Example 2 Insulinostatic Effects of Human PYY and Related Piscine-Derived PYY Species The effects of human PYY(1-36) and four piscine-derived PYY variants on insulin release (20 min) from rodent BRIN-BD11 beta-cells at 16.7 mM glucose were investigated; as described in the insulin secretion methodology above. The results are shown in FIG. 1. Values are mean±SEM (n=8). *$p<0.05$,  $p<0.01$, * $p<0.001$ compared to 16.7 mM glucose control.

Example 3 Effects of Human PYY and Related Piscine-Derived PYY Species on Human Beta-Cell Proliferation and Apoptosis The effects of human PYY(1-36) and four piscine-derived PYY variants (each at $10^{-8}$ and $10^{-6}$ M) on proliferation and protection against apoptosis in human 1.1B4 beta-cells were investigated; as described in the beta-cell proliferation and apoptosis studies methodology above. Proliferation was measured by Ki-67 staining and apoptosis by TUNEL assay following incubation of peptides in the presence of a cytokine cocktail (TNF-α (200 U/mL), IFN-γ (20 U/mL) and IL 1B (100 U/mL)). The results are shown in FIG. 2. FIG. 2A shows the effects of human PYY(1-36) and four piscine-derived PYY variants (each at 108 and 10-6 M) on proliferation in human 1.1B4 beta-cells. FIG. 2B shows the effects of human PYY(1-36) and four piscine-derived PYY variants (each at $10^{-8}$ and $10^{-6}$ M) on protection against apoptosis in human 1.1B4 beta-cells. Values are mean±SEM (n=4). *$p<0.05$,  $p<0.01$, * $p<0.001$ compared to untreated media control. $^\Delta p<0.05$ compared to respective concentration of human PYY(1-36).

Example 4 Effects of Human PYY and Related Piscine-Derived PYY Species on Feeding The effects of human PYY(1-36) and four piscine-derived PYY variants on food intake in overnight fasted mice were investigated; as described in the food intake methodology above. Cumulative food intake was assessed following intraperitoneal administration of vehicle (0.9% NaCl) alone or in combination with test peptide (each at 25 nmol/kg bw). The results are shown in FIG. 3. Values are mean±SEM (n=6). * $p<0.05$, ** $p<0.01$ compared to vehicle treated control. $^\Delta p<0.05$, $^{\Delta\Delta} p<0.01$ $^{\Delta\Delta\Delta} p<0.001$ compared to human PYY(1-36).

Example 5 Insulin Secretion

Figure 4:
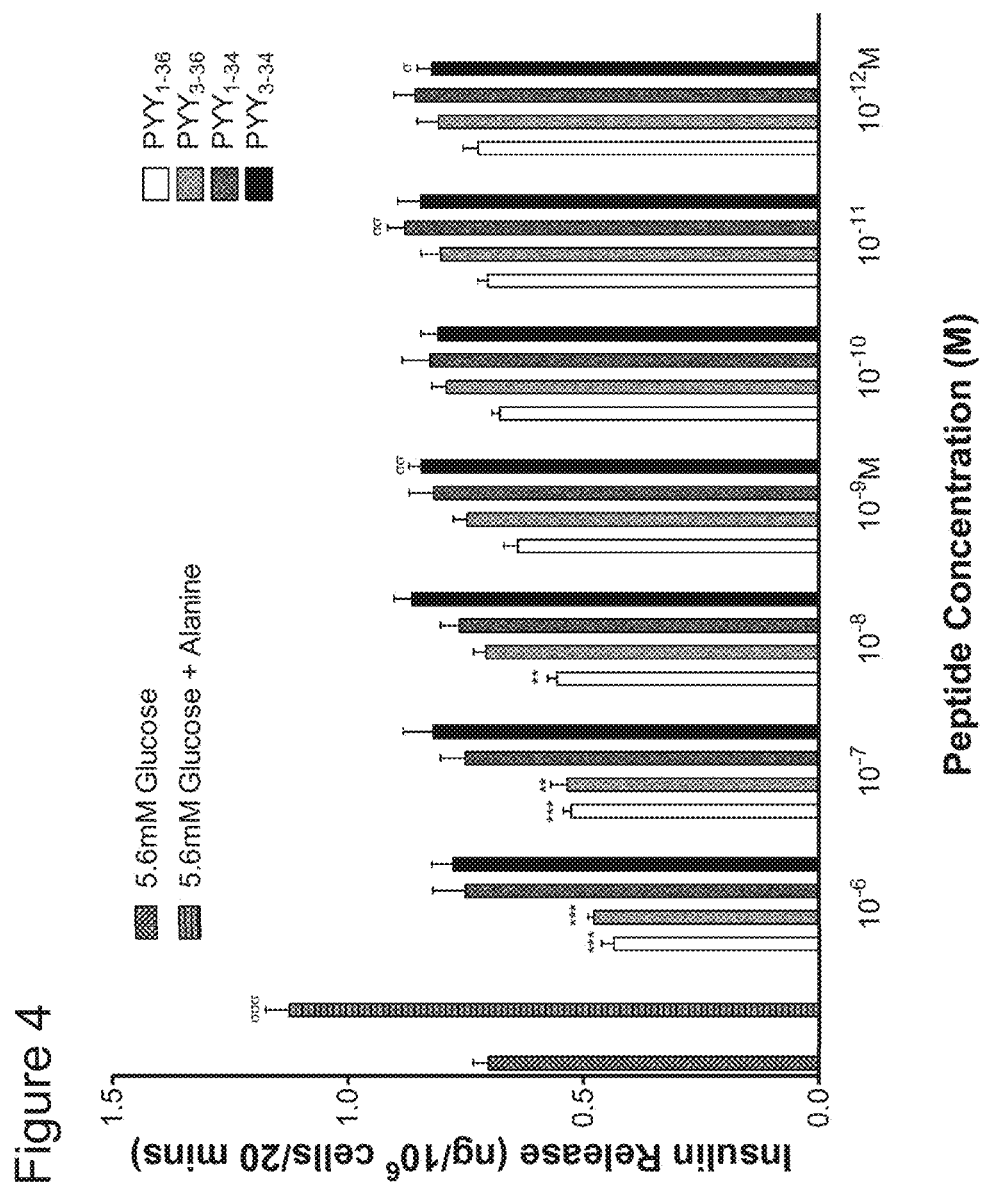
FIG. 4 shows a chart illustrating insulin release (ng/$10^6$ cells/20 minutes) from immortalised rodent BRIN-BD11 beta-cells at basal, 5.6 mM, glucose concentration on the Y-axis, against the concentration of several human PYY metabolites on the X-axis. The human PYY metabolites include $PYY_{1-36}$, $PYY_{3-36}$, $PYY_{1-34}$, $PYY_{3-34}$, as shown by the key. Values are mean±SEM (n=8).  p<0.01, * p<0.001 decreases compared to 5.6 mM glucose control. $^{\circ}$p<0.05, $^{\circ\circ}$p<0.01 increases compared to human PYY(1-36); $^{\circ\circ\circ}$p<0.001 increases compared to 5.6 mM glucose control.
Figure 5:
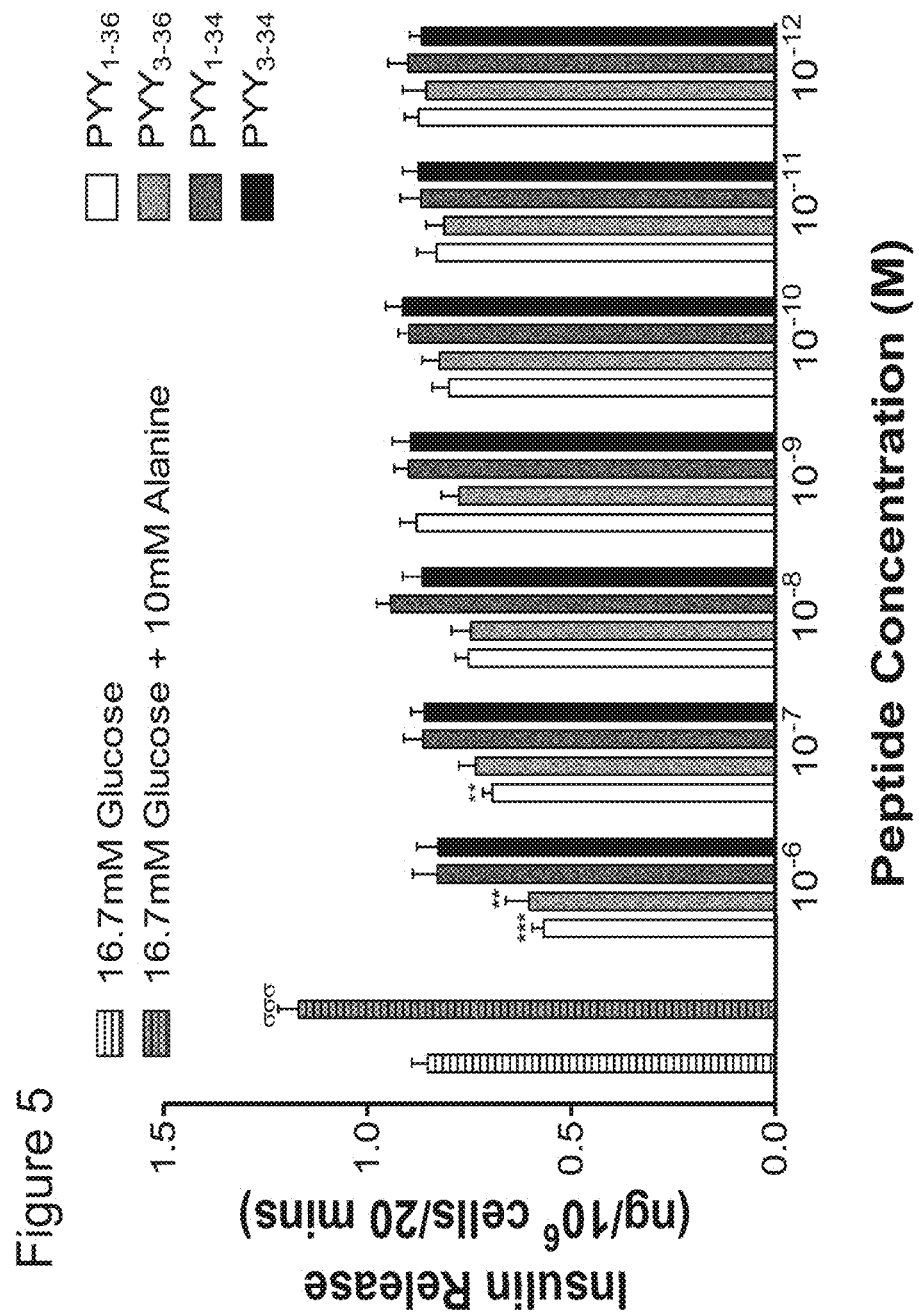
FIG. 5 shows a chart illustrating insulin release (ng/$10^6$ cells/20 minutes) from immortalised rodent BRIN-BD11 beta-cells at elevated, 16.7 mM, glucose concentration on the Y-axis, against the concentration of several human PYY metabolites on the X-axis. The human PYY metabolites include $PYY_{1-36}$, $PYY_{3-36}$, $PYY_{1-34}$, $PYY_{3-34}$, as shown by the key. Values are mean±SEM (n=8). * p<0.05,  p<0.01, * p<0.001 decreases compared to 16.7 mM glucose control. $^{\circ\circ\circ}$p<0.001 increases compared to 16.7 mM glucose control.

The effects of PYY1-36 and its N- and C-terminal metabolites on insulin release from immortalised rodent BRIN-BD11 beta-cells at basal (5.6 mM) and elevated (16.7 mM) glucose concentrations were investigated; as described in the insulin secretion methodology above. The results for basal, 5.6 mM, gluclose concentration are shown in FIG. 4, while the results for elevated, 16.7 mM, glucose concentration are shown in FIG. 5. Values are mean±SEM (n=8). * $p<0.05$,  $p<0.01$, * $p<0.001$ decreases compared to 5.6 mM glucose control. $^\circ p<0.05$, $^{\circ\circ} p<0.01$, $^{\circ\circ\circ} p<0.001$ increases compared to the glucose control (5.6 mM glucose in FIG. 4, 16.7 mM glucose in FIG. 5).

Example 6 Protection from Apoptosis

The effects of PYY1-36 and its N- and C-terminal metabolites (3-36), (1-34) and (3-34) on apoptosis in immortalised rodent BRIN-BD11 cells and 1.1B4 cells at $10^{-6}$M and $10^{-8}$ M concentrations were investigated; as described in the beta-cell proliferation and apoptosis studies methodology above.

Figure 6:
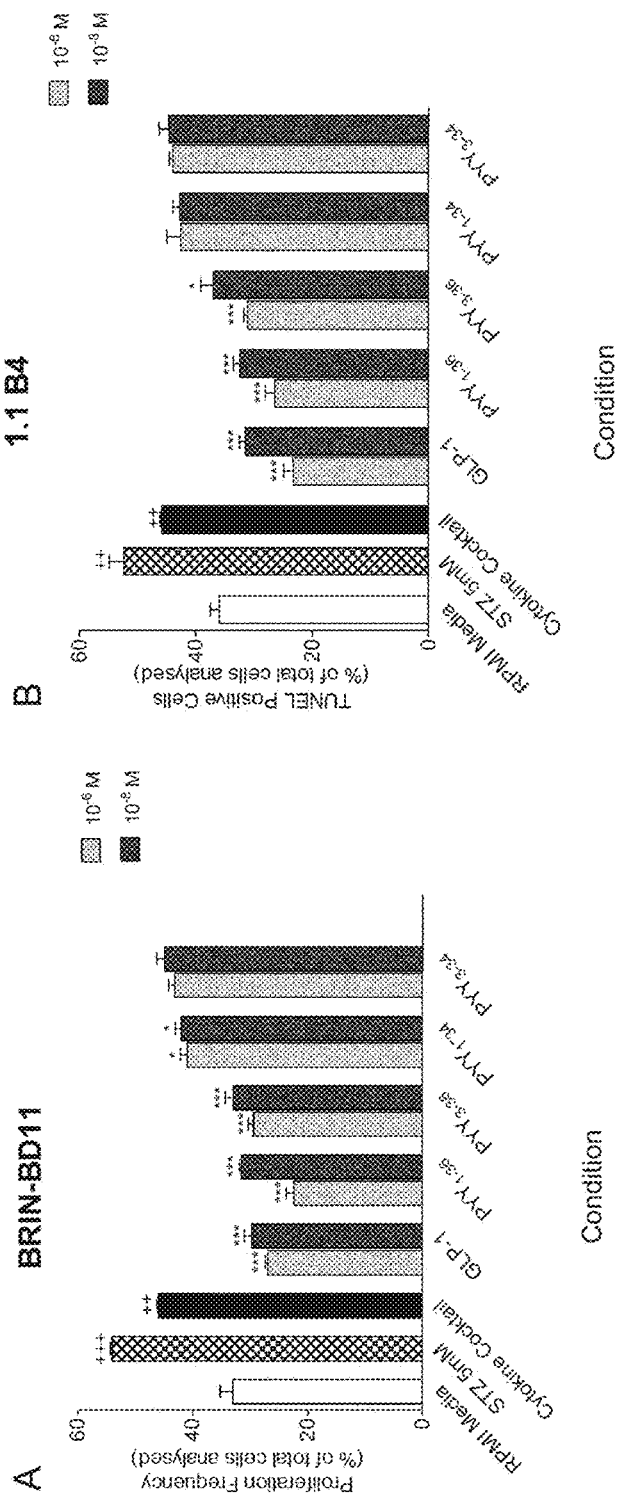
FIG. 6 includes two charts.

Peptides were incubated with cells in the presence of a cytokine cocktail mixture (TNF-a (200 U/mL, IFN-γ (20 U/mL and IL 1B (100 U/mL))). The results are shown in FIG. 6. FIG. 6A shows the effects of PYY1.36 and its metabolites (3-36), (1-34) and (3-34), each at $10^{-8}$ and $10^{-6}$ M, on apoptosis in immortalised rodent BRIN-BD11 cells. FIG. 6B shows the effects of $PYY_{1-36}$ and its metabolites (3-36), (1-34) and (3-34), each at $10^{-8}$ and $10^{-6}$ M, on apoptosis in 1.1B4 cells. Values are mean±SEM (n=3). * p<0.05,  p<0.01, * p<0.001 compared to untreated, media control. * p<0.05,  p<0.01, * p<0.001 compared to cytokine mixture alone.

Example 7 Proliferation

Figure 7:
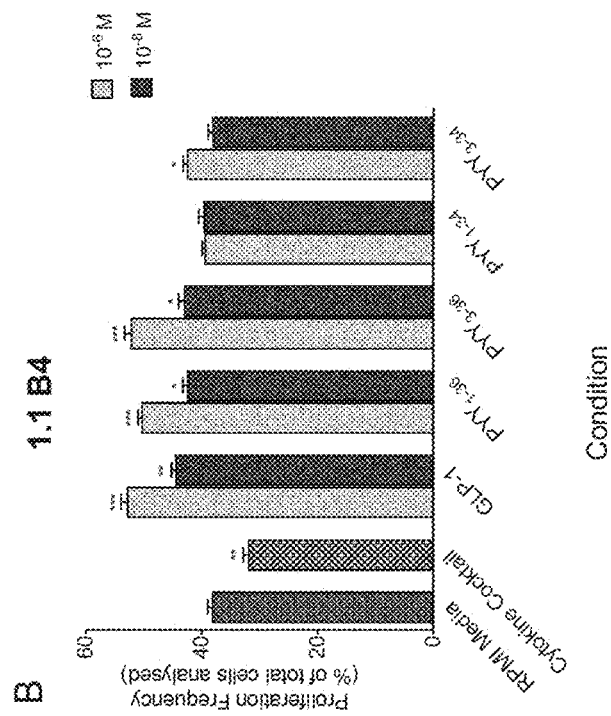
FIG. 7 includes two charts.
Figure 7:
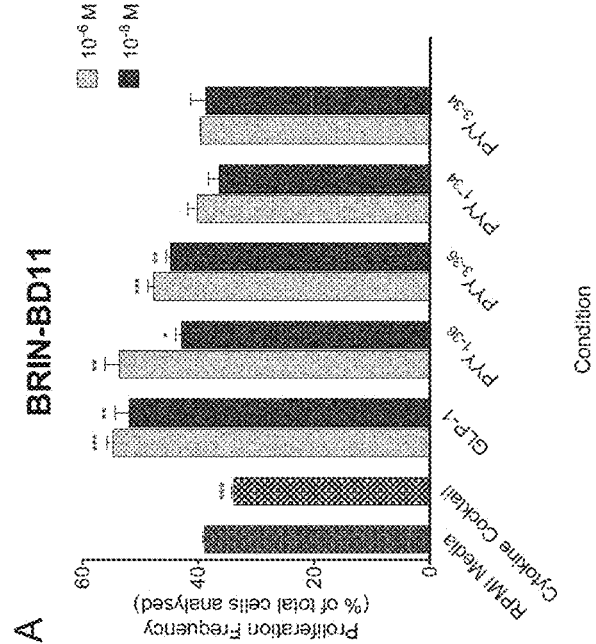
Figure 8A:
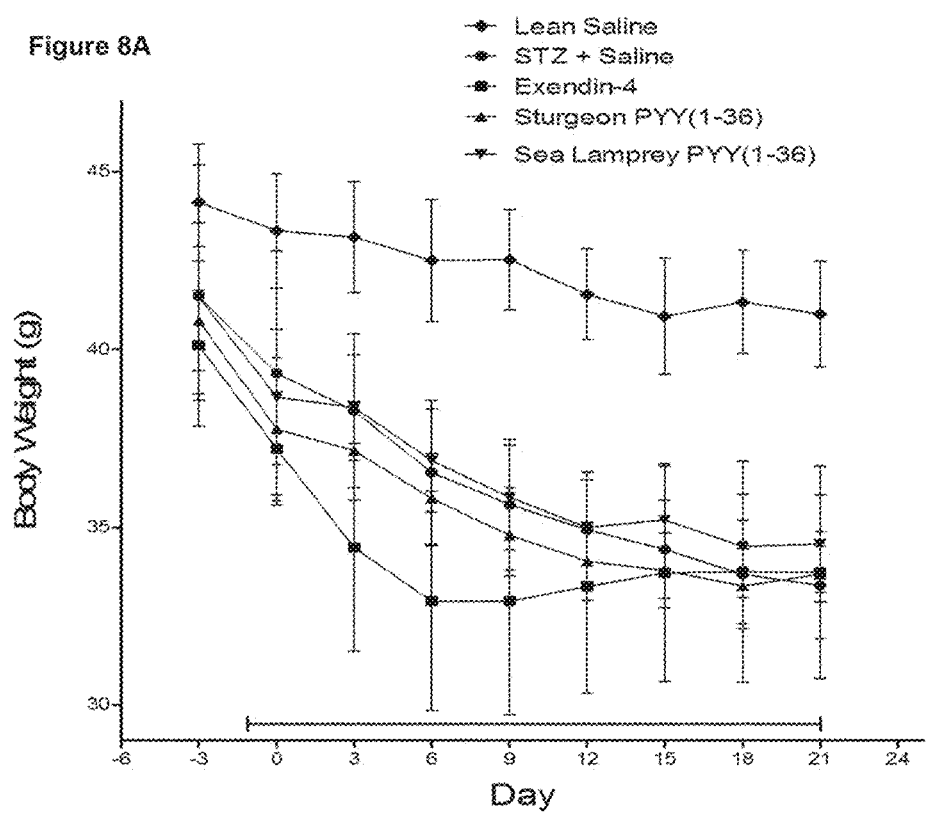
FIG. 8 shows a chart illustrating effects of twice-daily administration of test-peptide on body weight. Effects of twice-daily administration of saline control or test peptide in combination with saline (Exendin-4, Sturgeon PYY(1-36) and Sea Lamprey PYY(1-36) at 25 nmol/kg bw dose) on bodyweight (FIG. 8A). Measurements were taken three days prior to and throughout the treatment period, at regular intervals. (Treatment period demonstrated via the horizontal bar parallel to x-axis) The % bodyweight change, from first to final treatment day, is also provided (FIG. 8B). Values are mean±SEM (n=6). $^{\Delta}$p<0.05 compared to lean, saline-only control.
Figure 8B:
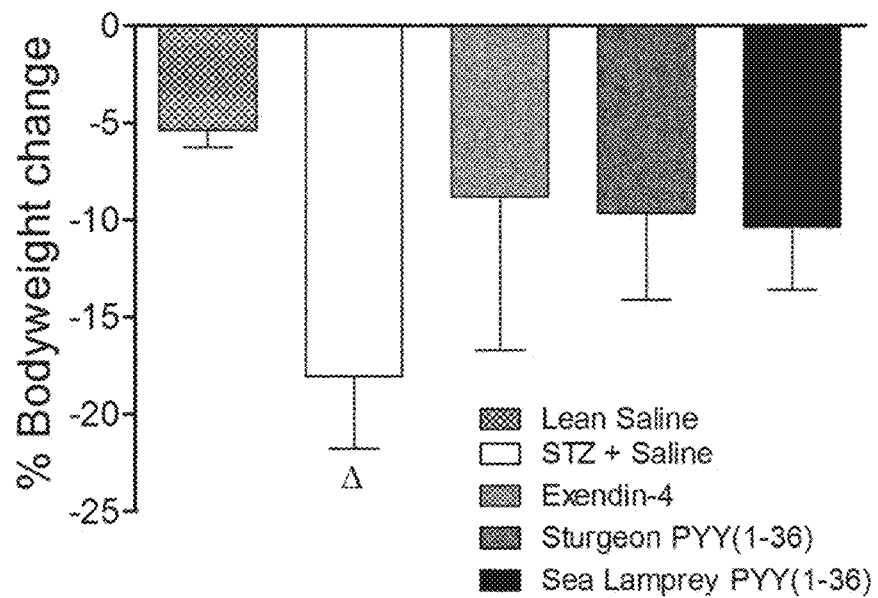
Figure 9:
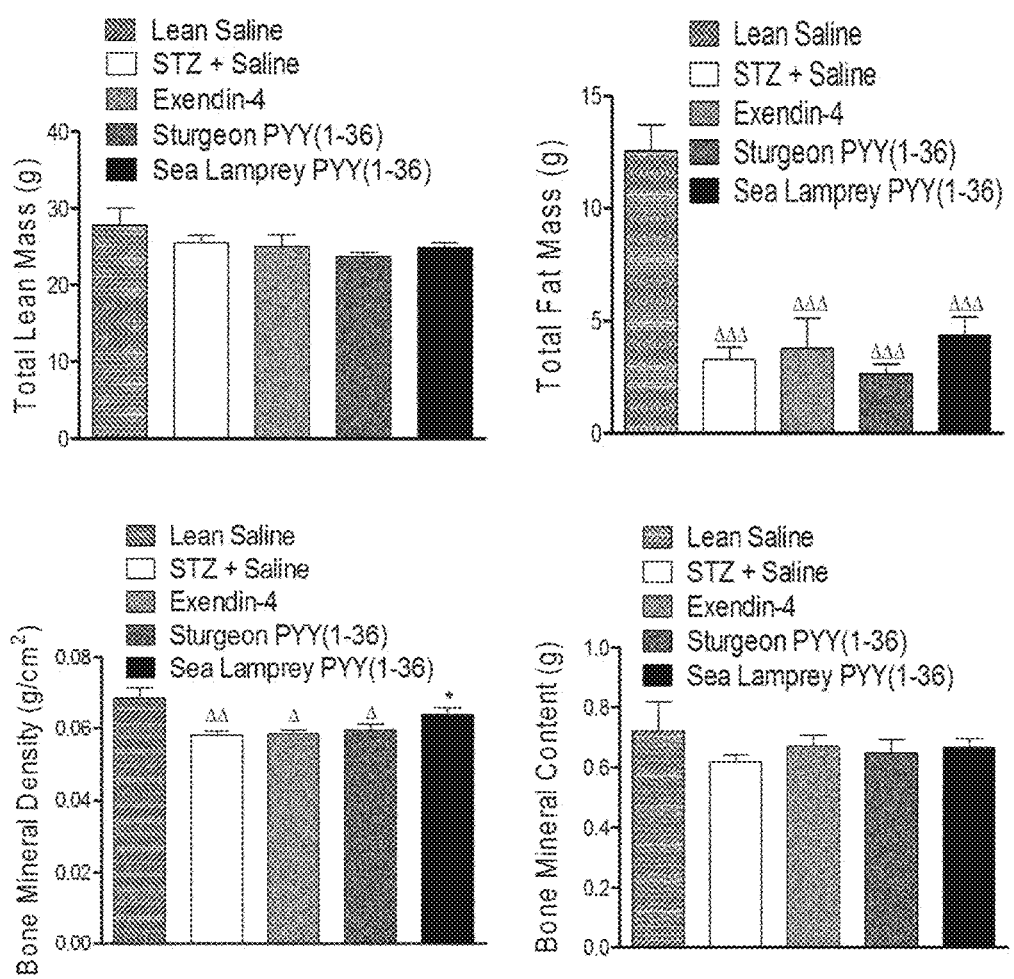
FIG. 9 shows a chart illustrating effects of twice-daily administration of test-peptide on terminal body composition. Effects of twice-daily administration of saline control or test peptide in combination with saline (Exendin-4, Sturgeon PYY(1-36) and Sea Lamprey PYY(1-36) at 25 nmol/kg bw dose) on body composition, with total lean mass and total fat mass provided for each group. Values are mean±SEM (n=6). * p<0.05 compared to STZ+saline control. Δp<0.05, ΔΔp<0.01, ΔΔΔp<0.001 compared to lean, saline-only control.
Figure 10A:
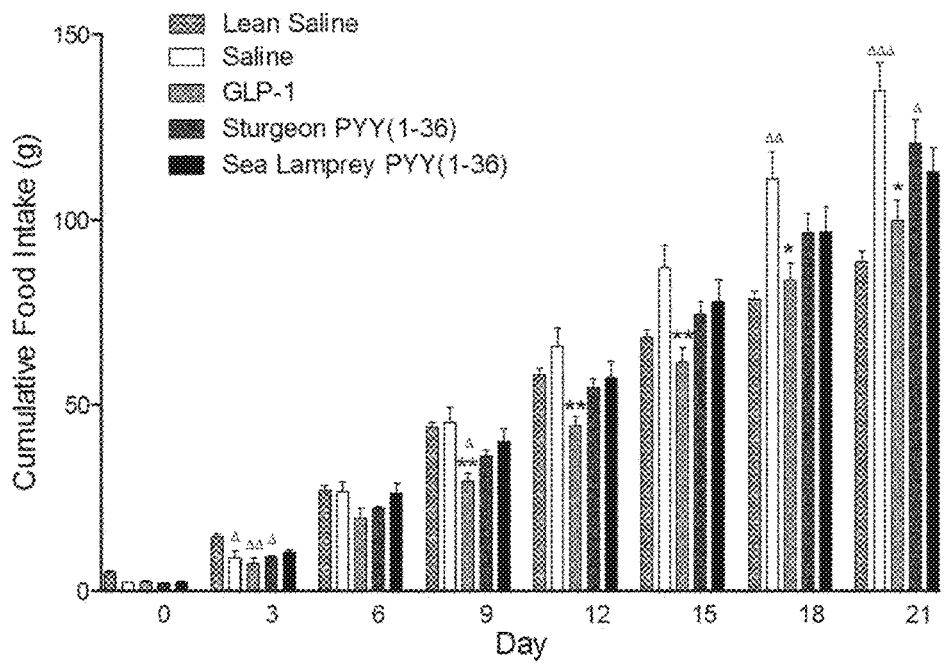
FIG. 10 shows a chart illustrating effects of twice-daily administration of test-peptide on food and fluid intake. Effects of twice-daily administration of saline control or test peptide in combination with saline (Exendin-4, Sturgeon PYY(1-36) and Sea Lamprey PYY(1-36) at 25 nmol/kg bw dose) on cumulative food (FIG. 10A) and cumulative fluid (FIG. 10B) intake, over the treatment period. Values are mean±SEM (n=6). * p<0.05, ** p<0.01 compared to stz+saline control. $^{\Delta}$p<0.05, $^{\Delta\Delta}$p<0.01, $^{\Delta\Delta\Delta}$p<0.001 compared to lean, saline-only control.
Figure 10B:
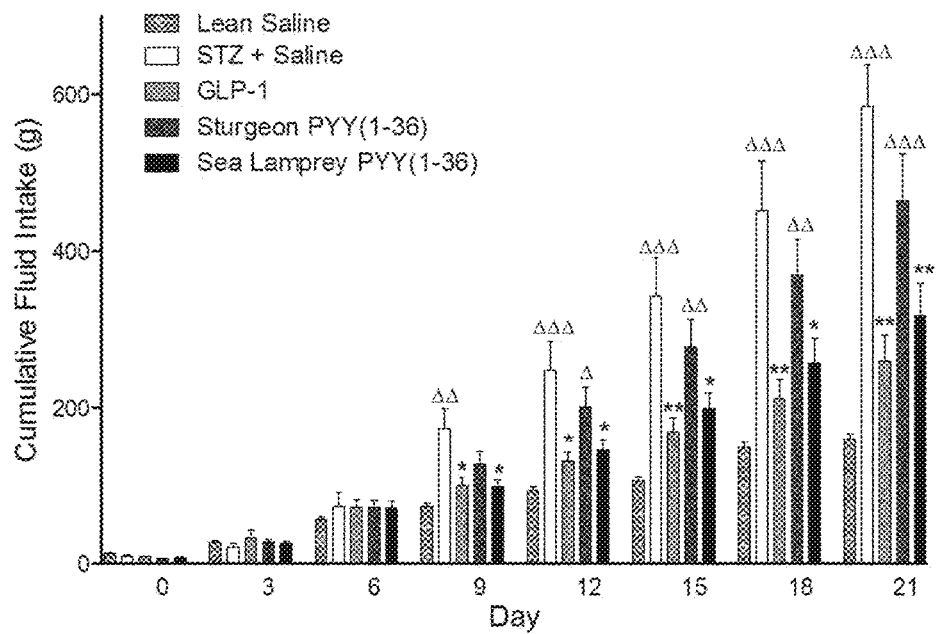
Figure 11A:
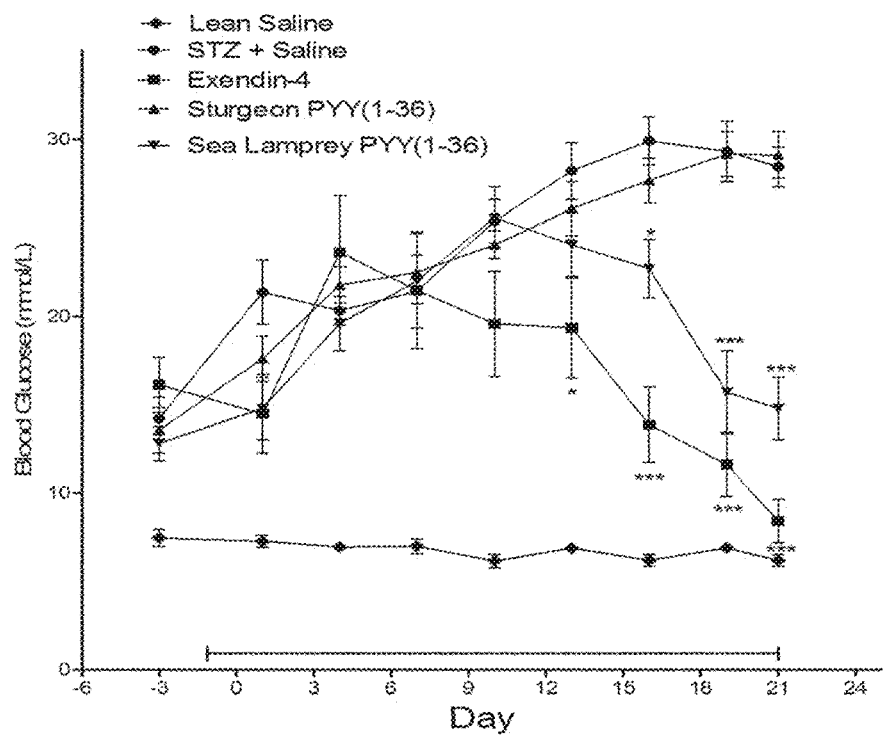
FIG. 11 shows a chart illustrating effects of twice-daily administration of test-peptide on blood glucose and circulating plasma. Effects of twice-daily administration of saline control or test peptide in combination with saline (Exendin-4, Sturgeon PYY(1-36) and Sea Lamprey PYY(1-36) at 25 nmol/kg bw dose) on blood glucose (FIG. 11A) and circulating plasma insulin (FIG. 11C). Measurements were taken three days prior to and throughout the treatment period, at regular intervals. (Treatment period demonstrated via the horizontal bar parallel to x-axis) Respective areas under the curve are provided (FIG. 11B, FIG. 11D). Values are mean±SEM (n=6). Values are mean±SEM (n=6). * p<0.05,  p<0.01, * p<0.001 compared to stz+saline control. Δp<0.05, ΔΔp<0.01, ΔΔΔp<0.001 compared to lean, saline-only control.
Figure 11B:
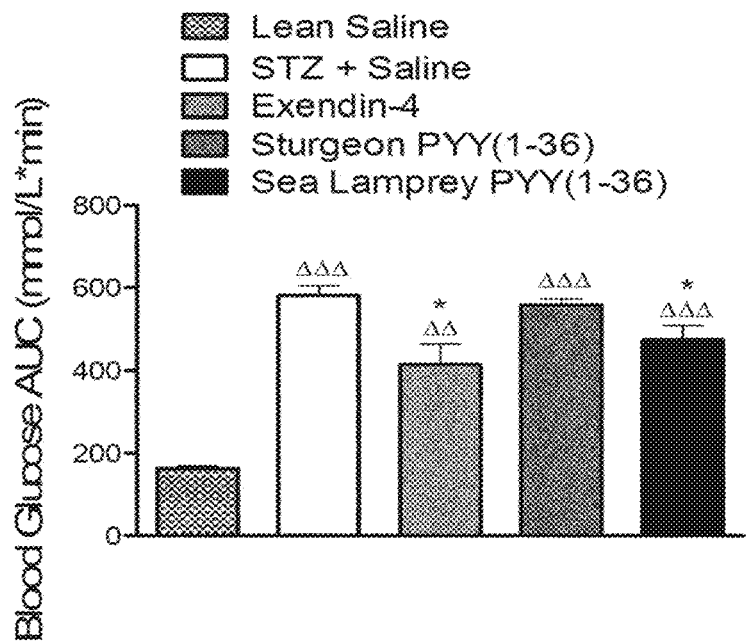
Figure 11C:
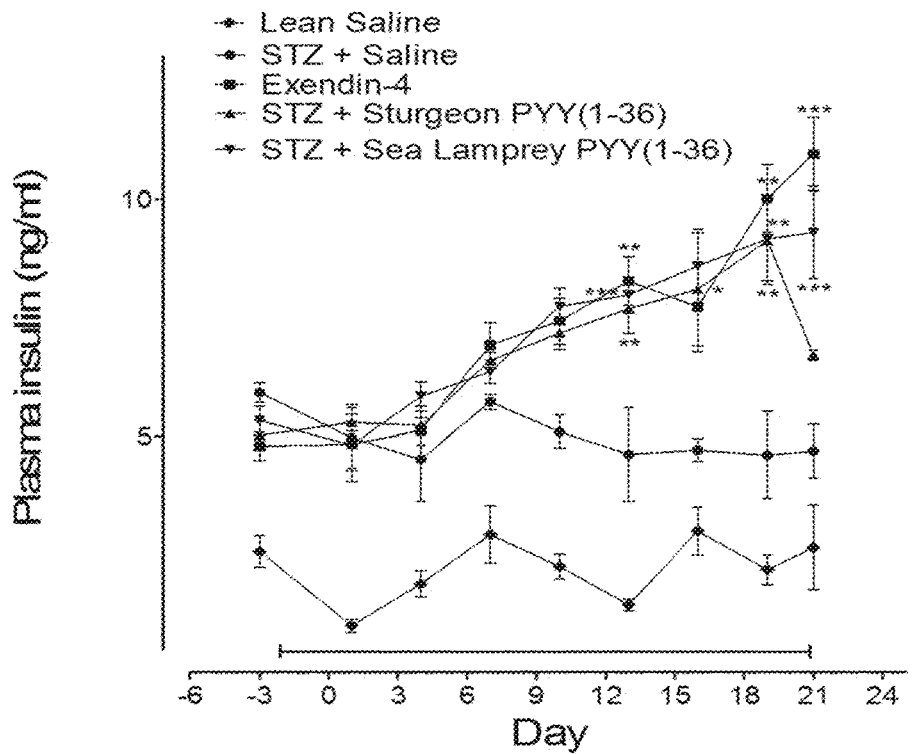
Figure 11D:
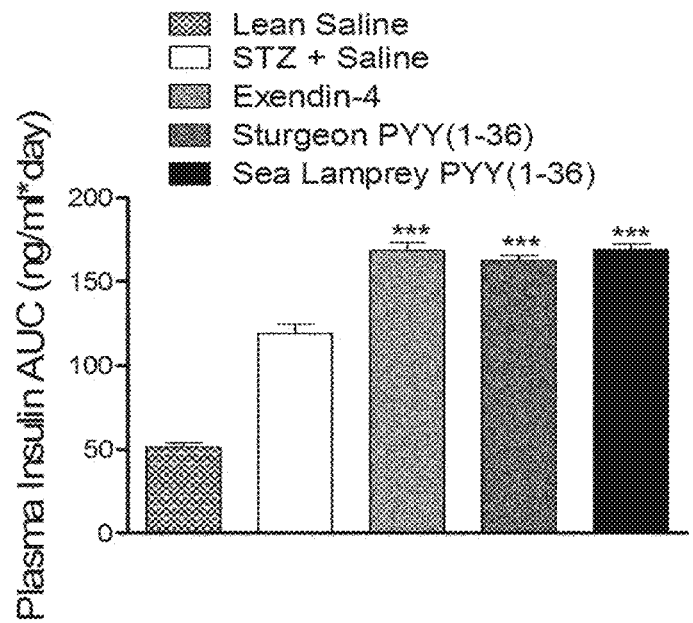
Figure 12A:
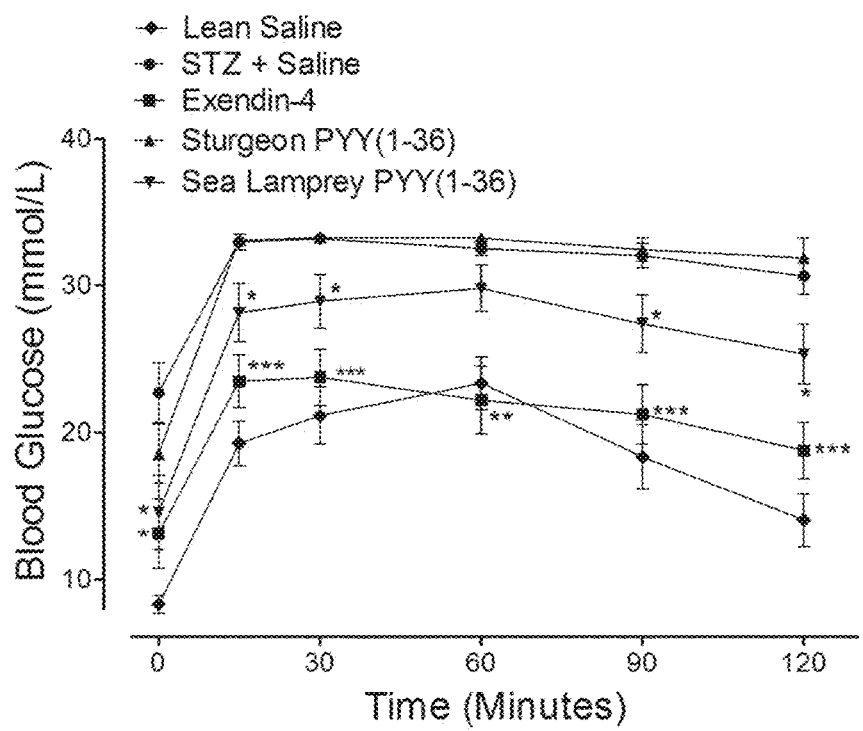
FIG. 12 shows a chart illustrating effects of twice-daily administration of test-peptide on terminal glucose tolerance and plasma insulin over a two hour period. Effects of twice-daily administration of saline control or test peptide in combination with saline (Exendin-4, Sturgeon PYY(1-36) and Sea Lamprey PYY(1-36) at 25 nmol/kg bw dose) on glucose tolerance (FIG. 12A) and circulating plasma insulin (FIG. 12C). Glucose was administered following an overnight (16 hour) fast via i.p. injection at an 18 mmol/kg bw dose. Blood glucose and plasma insulin were measured prior to, and after i.p. injection at regular intervals. Experiment was performed following 21 days of treatment with test peptide. Respective areas under the curve are provided (FIG. 12B, FIG. 12D). Values are mean±SEM (n=6). * p<0.05,  p<0.01, * p<0.001 compared to STZ+saline control. Δp<0.05, ΔΔp<0.01, ΔΔΔp<0.001 compared to lean, saline-only control.
Figure 12B:
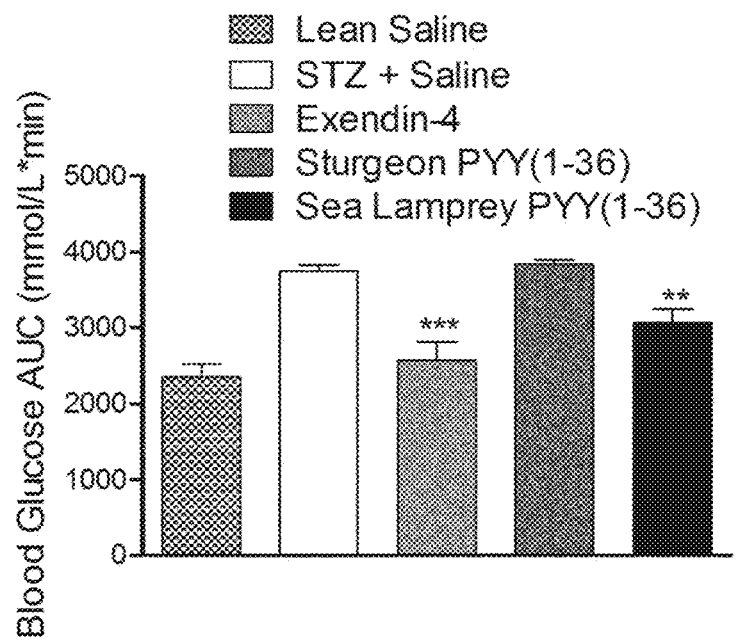
Figure 12C:
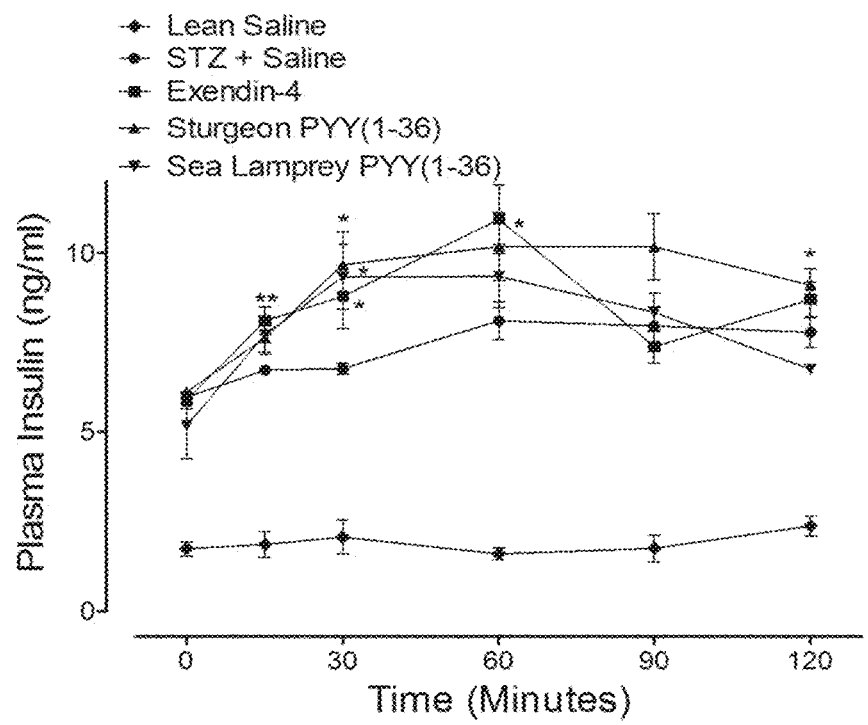
Figure 12D:
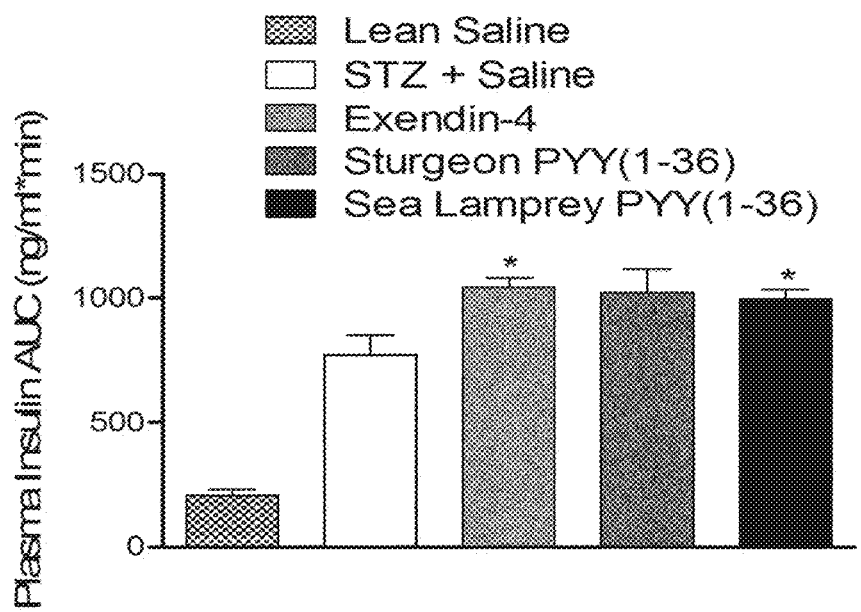
Figure 13A:
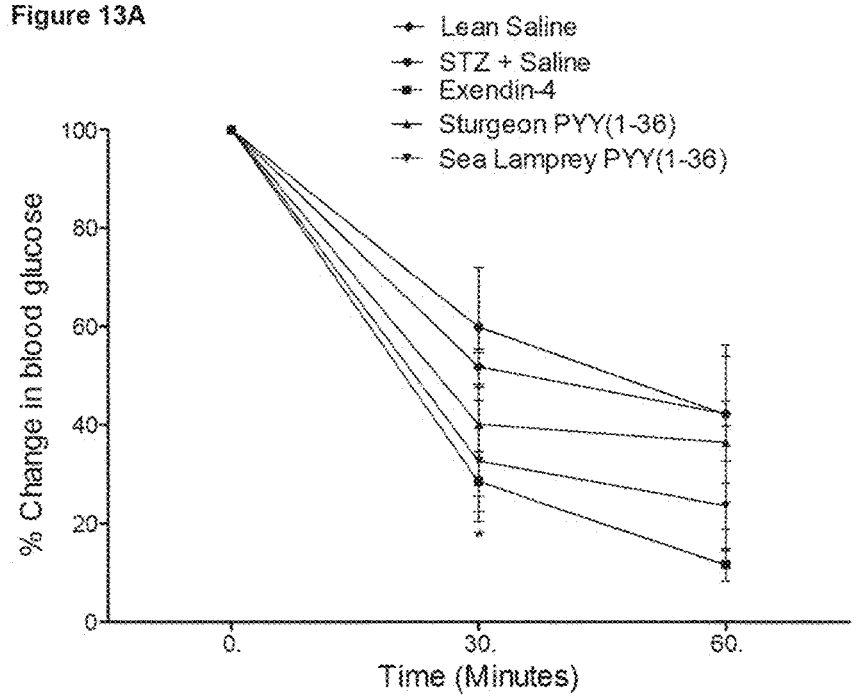
FIG. 13 shows a chart illustrating effects of twice-daily administration of test-peptide on terminal insulin sensitivity. Effects of twice-daily administration of saline control or test peptide in combination with saline (Exendin-4, Sturgeon PYY(1-36) and Sea Lamprey PYY(1-36) at 25 nmol/kg bw dose) on insulin sensitivity, as demonstrated via percentage fall in blood glucose over 60 minutes (FIG. 13A). Insulin was administered at a 25 U/kg/bw dose in non-fasting mice. Experiment was performed following 21 days of treatment with test peptide. Respective areas under the curve are provided (FIG. 13B). Values are mean±SEM (n=6). * p<0.05 compared to stz+saline control. ΔΔΔp<0.001 compared to lean, saline-only control.
Figure 13B:
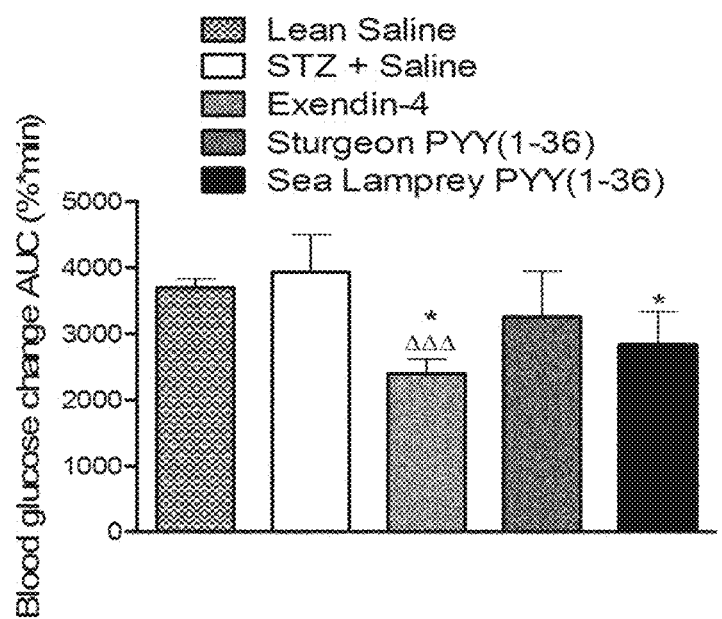
Figure 14:
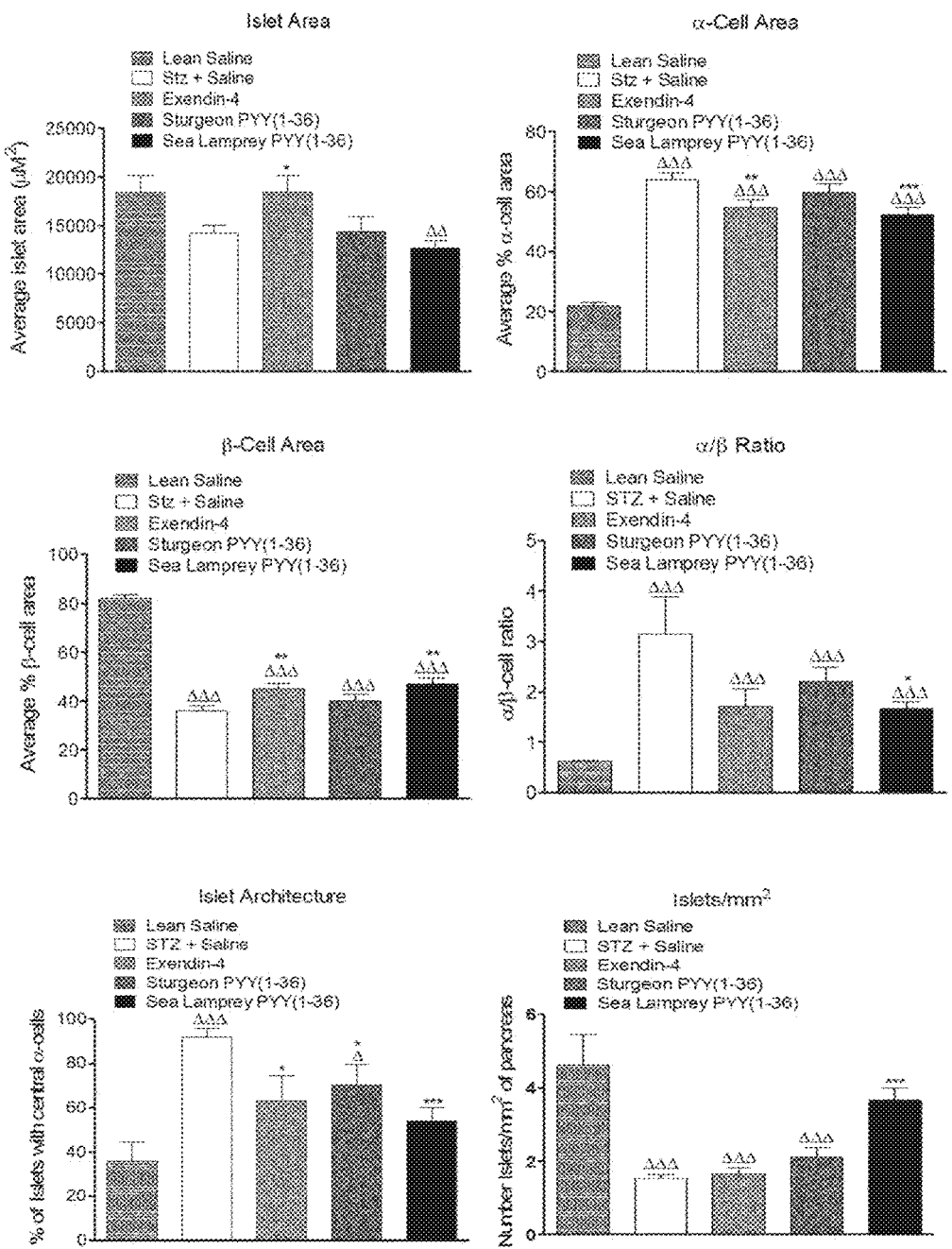
FIG. 14 shows a chart illustrating effects of twice-daily administration of test-peptide on pancreatic histology. Effects of twice-daily administration of saline control or test peptide in combination with saline (Exendin-4, Sturgeon PYY(1-36) and Sea Lamprey PYY(1-36) at 25 nmol/kg bw dose) on pancreatic morphology. Variables were assessed using CellF image analysis software after 21 days of twice-daily i.p injections. Values are means±SEM of 6-8 mice per group, with approximately 50 islets being analysed per group (A-D). * p<0.05,  p<0.01, * p<0.001 compared to STZ+saline control. Δp<0.05, ΔΔp<0.01, ΔΔΔp<0.001 compared to lean, saline-only control.
Figure 14:
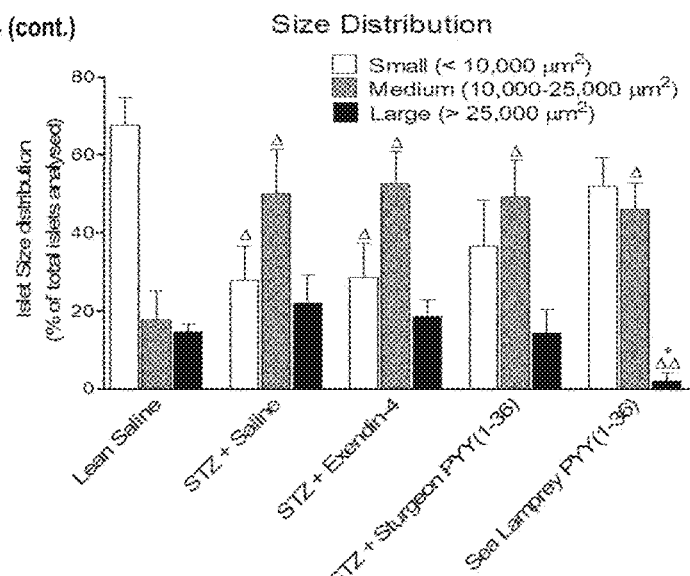
Figure 15:
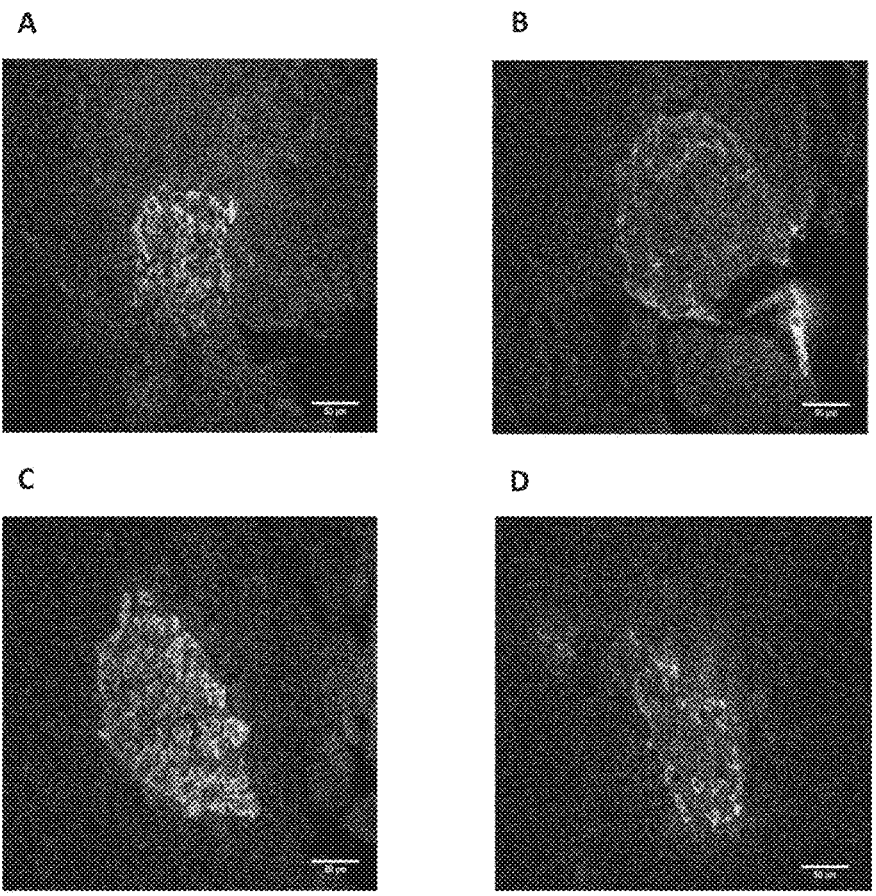
FIG. 15 shows representative images, demonstrating the effects of twice daily administration of test peptide on pancreatic morphology. Representative images of islets showing insulin (red) and glucagon (green) immunoreactivity from pancreatic tissues extracted from lean Swiss TO mice following streptozotocin pretreatment. Animals received twice daily doses of saline control (FIG. 15A) or test peptide in combination with saline (Exendin-4 (FIG. 15B), Sturgeon PYY(1-36) (FIG. 15C) and Sea Lamprey PYY(1-36) (FIG. 15D) at 25 nmol/kg bw dose). Images were obtained at 40× magnification using CellF software.

The effects of PYY1.36 and its N- and C-terminal metabolites (3-36), (1-34) and (3-34) on proliferation of immortalised rodent BRIN-BD11 cells and 1.1B4 cells at $10^{-6}$ M and $10^{-8}$ M concentrations were investigated; as described in the beta-cell proliferation and apoptosis studies methodology above. The results are shown in FIG. 7. FIG. 7A shows the effects of $PYY_{1-36}$ and its metabolites (3-36), (1-34) and (3-34), each at $10^{-8}$ and $10^{-6}$ M, on proliferation of immortalised rodent BRIN-BD11 cells. FIG. 7B shows the effects of $PYY_{1-36}$ and its metabolites (3-36), (1-34) and (3-34), each at $10^{-8}$ and $10^{-6}$ M, on proliferation of immortalised rodent 1.1B4 cells. Values are mean±SEM (n=3). * p<0.05,  p<0.01, * p<0.001 compared to control.

Example 8 Effects of Sea Lamprey PYY and Sturgeon PYY on Body Weight, Terminal Body Composition, Food and Fluid Intake, Blood Glucose and Circulating Plasma, Terminal Glucose Tolerance and Plasma Insulin, Terminal Insulin Sensitivity, Pancreatic Histology, and Pancreatic Morphology The effects of sea lamprey PYY and sturgeon PYY on body weight, terminal body composition, food and fluid intake, blood glucose and circulating plasma, terminal glucose tolerance and plasma insulin, terminal insulin sensitivity, pancreatic histology, and pancreatic morphology in overnight fasted mice were investigated; as described in the food intake methodology above. Each of body weight, terminal body composition, food and fluid intake, blood glucose and circulating plasma, terminal glucose tolerance and plasma insulin, terminal insulin sensitivity, pancreatic histology, and pancreatic morphology was assessed following intraperitoneal administration of vehicle (0.9% NaCl) alone or in combination with test peptide (each at 25 nmol/kg bw) twice daily for 21 days to a multiple low-dose streptozotocin (50 mg/kg for five consecutive days) mouse model of diabetes. The results are shown in FIGS. 8-15. These data provide evidence for the beneficial metabolic and islet architecture effects of sturgeon, and especially sea lamprey, PYY.

Example 9 Generation of Stable PYY Peptide Analogues

Figure 16:
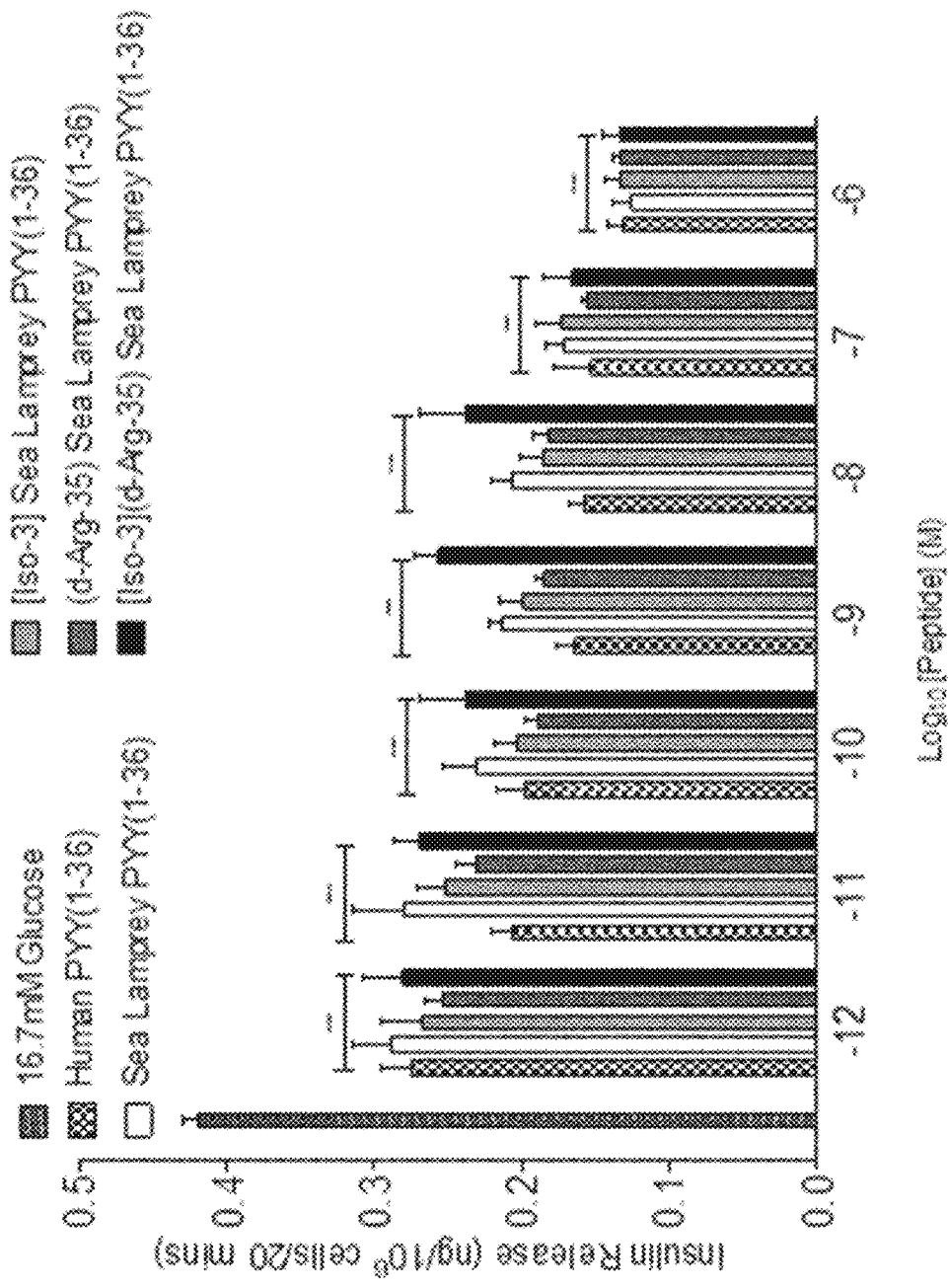
FIG. 16 shows a chart illustrating insulin secretory activity of Sea Lamprey PYY, (Ile3) Sea Lamprey PYY, (D-Arg35) Sea Lamprey PYY and (Ile3, D-Arg35) Sea Lamprey PYY in BRIN BD11 beta-cells. Effects of PYY (1-36), Sea Lamprey PYY(1-36) and related analogues on insulin release from rodent BRIN-BD11 beta-cells at 16.7 mM, glucose concentration. Values are mean±SEM (n=8). * p<0.05,  p<0.01, * p<0.001 decreases compared to 5.6 mM glucose control.
Figure 17:
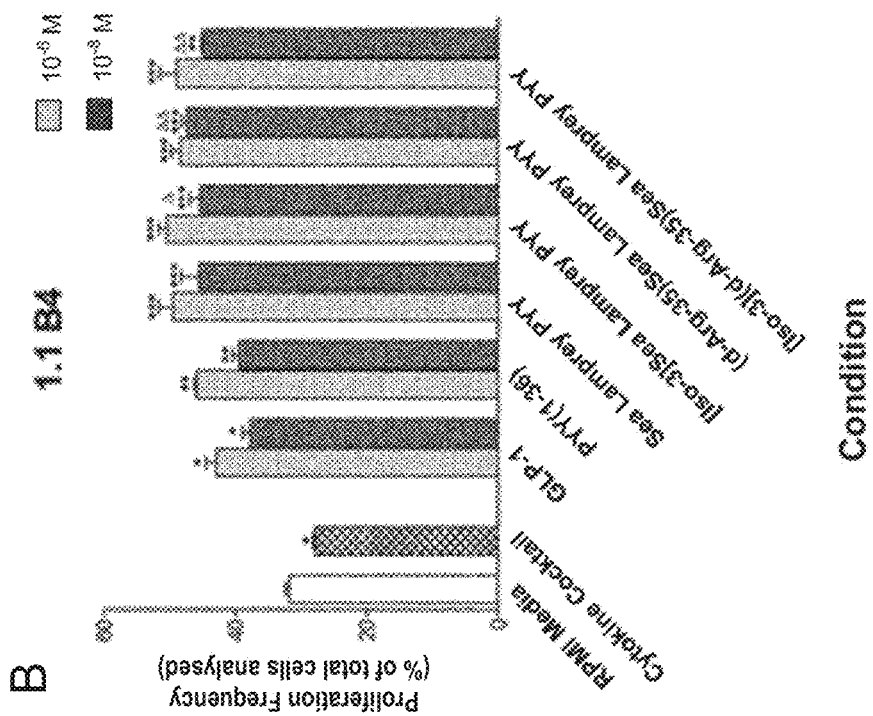
FIG. 17 shows a chart illustrating proliferative activity of Sea Lamprey PYY, (Ile3) Sea Lamprey PYY, (D-Arg35) Sea Lamprey PYY and (Ile3, D-Arg35) Sea Lamprey PYY in rodent BRIN BD11 and human 1.1B4 clonal beta-cells. Effects of PYY(1-36), Sea Lamprey PYY(1-36) and related analogues on proliferation of BRIN-BD11 (FIG. 17A) and 1.1 B4 cells (FIG. 17B) at 10-6 and 10-8 M concentrations. Values are mean±SEM (n=3). * p<0.05,  p<0.01, * p<0.001 compared to control. Δp<0.05, ΔΔp<0.01, ΔΔΔp<0.001 compared to native PYY(1-36) at the same concentration.
Figure 17:
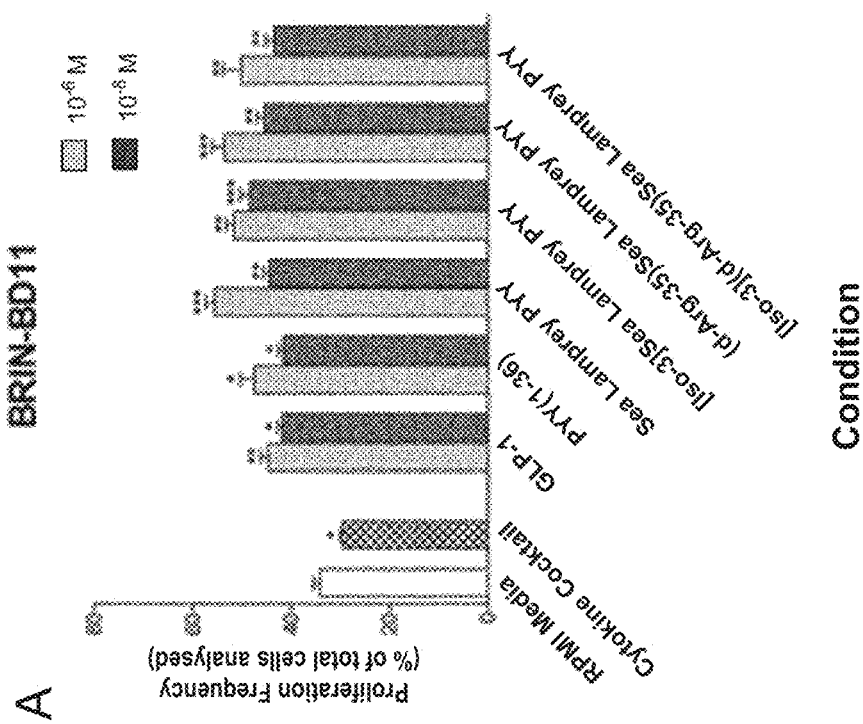
Figure 18:
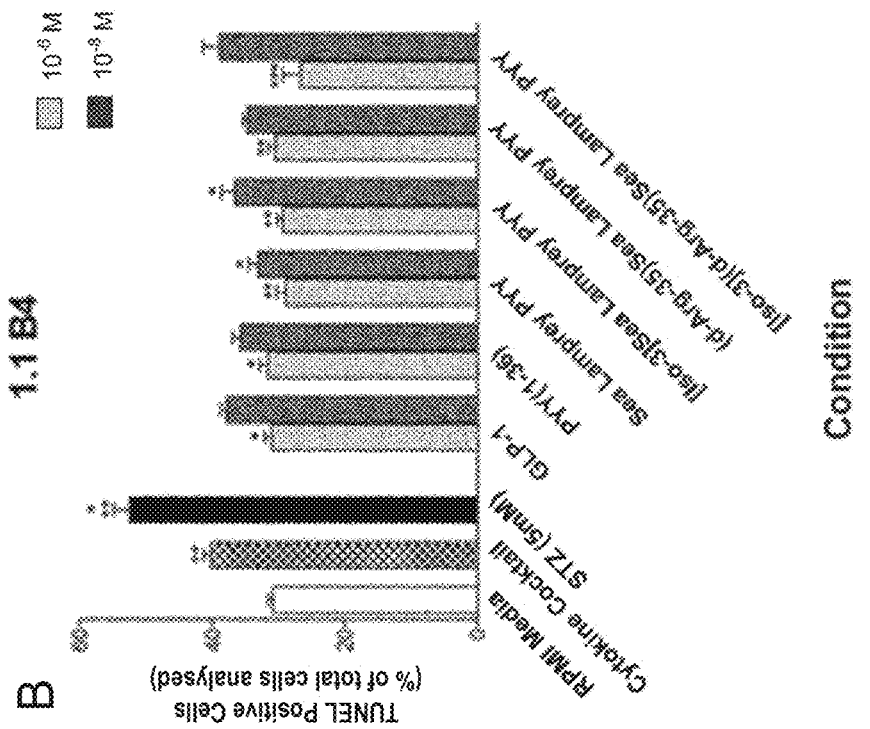
FIG. 18 shows a chart illustrating effects of Sea Lamprey PYY, (Ile3) Sea Lamprey PYY, (D-Arg35) Sea Lamprey PYY and (Ile3, D-Arg35) Sea Lamprey PYY on protection against cytokine-induced apoptosis in rodent BRIN BD11 and human 1.1B4 clonal beta-cells. Effects of PYY(1-36), Sea Lamprey PYY(1-36) and related analogues on protection against cytokine-induced (IL-1β (100 U/mL), IFNγ (20 U/mL), TNFα (200 U/mL)) apoptosis in BRIN-BD11 (FIG. 18A) and 1.1 B4 cells (FIG. 18B) at 10-6 and 10-8 M concentrations. Values are mean±SEM (n=3). * p<0.05,  p<0.01, * p<0.001 compared to control. Δp<0.05, ΔΔp<0.01, ΔΔΔp<0.001 compared to native PYY(1-36) at the same concentration.
Figure 18:
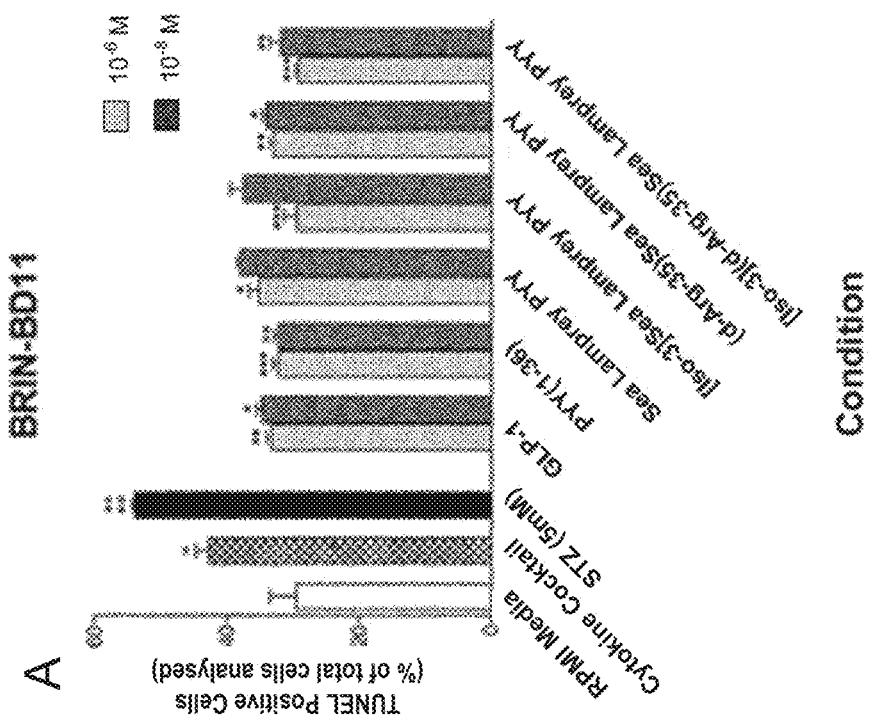
Figure 19:
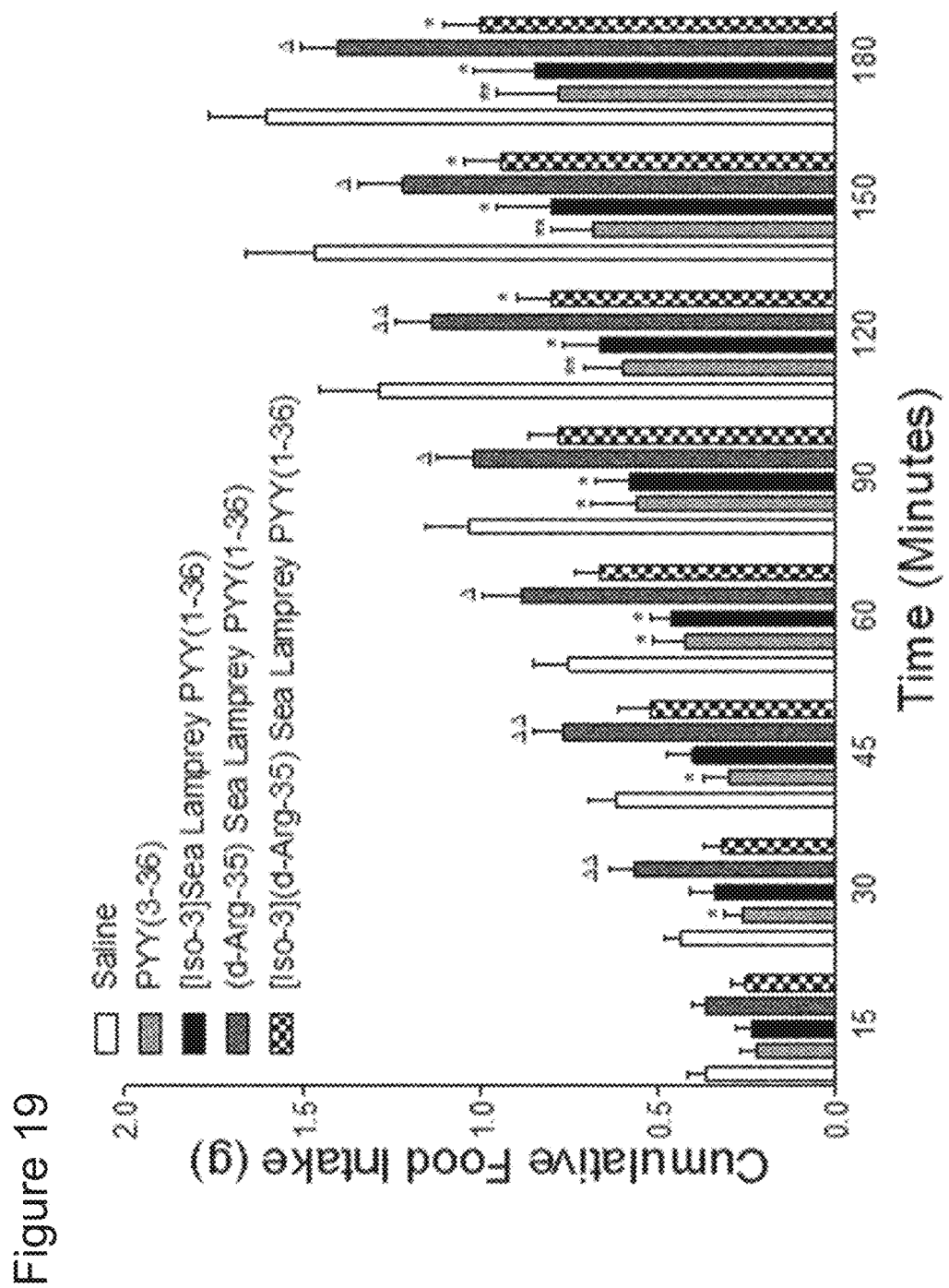
FIG. 19 shows a chart illustrating effects of Sea Lamprey PYY, (Ile3) Sea Lamprey PYY, (D-Arg35) Sea Lamprey PYY and (Ile3, D-Arg35) Sea Lamprey PYY on food intake in overnight fasted mice. Acute effects of PYY(3-36), Sea Lamprey PYY(1-36) and related analogues on food intake in 18 h fasted mice. PYY(3-36) was also employed as a positive control. Cumulative food intake was assessed following intraperitoneal administration of dissolution vehicle (0.9% NaCl) alone or in combination with test peptide at a dose of 25 nmol/kg bw. Values are mean±SEM (n=6). * p<0.05,  p<0.01, * p<0.001 compared to saline alone. Δp<0.05, ΔΔp<0.01, ΔΔΔp<0.001 compared to PYY(3-36) control.

Further to the recognised importance of maintenance of C-terminal integrity for PYY peptide bioactivity as shown in FIGS. 4-7, the inventors have generated novel analogues of Sea Lamprey PYY (Table 2). Essentially, the inventors have generated a combination of Sea Lamprey PYY peptides that are enzymatically stable or liable at both the N- and C-termini. As such, native Sea Lamprey PYY is N-terminally stable but C-terminally liable. (Ile3) Sea Lamprey PYY is enzymatically liable at both the N- and C-termini. (D-Arg35) Sea Lamprey PYY is enzymatically stable at both the N- and C-termini. Finally, (Ile3, D-Arg35) Sea Lamprey PYY is enzymatically liable at the N-terminus but stable at the C-terminus. The data contained below confirm N- and C-terminal stability of the Sea Lamprey PYY peptides (Table 3). In addition to this, the example also show insulin secretory actions (FIG. 16) together with effects on pancreatic beta-cell proliferation (FIG. 17) and protection against apoptosis (FIG. 18), of all peptides. Finally, the effects of Sea Lamprey PYY, and related analogues, on re-feeding in overnight fasted mice is also presented (FIG. 19).

TABLE 2

Amino acid sequence of PYY peptide analogues

| Amino acid sequence | SEQ ID NO | Peptide |
|---|---|---|
| MPPKPDNPSPDASPEELSKYMLAVRNYINLITRQRY-NH$_2$ | 4 | Sea Lamprey PYY(1-36) |
| MPIKPDNPSPDASPEELSKYMLAVRNYINLITRQRY-NH$_2$ | 9 | [Iso-3]Sea Lamprey PYY(1-36) |
| MPPKPDNPSPDASPEELSKYMLAVRNYINLITRQ(d-R)Y-NH$_2$ | 10 | (D-Arg-35)Sea Lamprey PYY(1-36) |
| MPIKPDNPSPDASPEELSKYMLAVRNYINLITRQ(d-R)Y-NH$_2$ | 11 | [Iso-3](d-Arg-35)Sea Lamprey PYY(1-36) |

TABLE 3

Enzymatic stability of PYY peptide analogues

| SEQ ID NO | Peptide Name | % Degradation | Identified Peptide Fragment(s) |
|---|---|---|---|
| 8 | Native PYY(1-36) | 49 | PYY(3-36), PYY(1-34) |
|  | Native PYY(3-36) | 36.4 | PYY(3-34) |
| 4 | Sea Lamprey PYY(1-36) | 47.4 | Sea Lamprey PYY(1-34) |

TABLE 3-continued

Enzymatic stability of PYY peptide analogues

| SEQ ID NO | Peptide Name | % Degradation | Identified Peptide Fragment(s) |
|---|---|---|---|
| 9 | [Iso-3]Sea Lamprey PYY(1-36) | 82.1 | [Iso-3]Sea Lamprey PYY(3-36) |
|   | [Iso-3]Sea Lamprey PYY(1-36) + Sitagliptin | 20.1 | [Iso-3]Sea Lamprey PYY(1-34) |
| 10 | (d-Arg-35)Sea Lamprey PYY(1-36) | 0 | None |
| 11 | [Iso-3](d-Arg-35)Sea Lamprey PYY(1-36) | 28.9 | [Iso-3](d-Arg-35)Sea Lamprey PYY(3-36) |

A summary of plasma degradation of human PYY(1-36) and PYY(3-36) as well as Sea Lamprey PYY(1-36) and its three related analogues is given in Table 3. Peptides were incubated at 37° C. in 50 mM TEA buffer containing plasma extracted from lean, overnight fasted, NIH, Swiss mice and reactions stopped at 4 h with 10% TFA. Degradation mixtures were then separated via RP-HPLC, with any relevant peaks being collected for identification via MALDI-TOF. Percentage of degradation is calculated via the peak area functionality in Chromquest Version 4.

The invention claimed is:

1. A method for treating diabetes in a patient in need thereof, the method comprising administering a piscine-derived peptide YY (PYY) peptide analogue to the patient; wherein the piscine-derived PYY peptide analogue comprises the amino acid sequence selected from the group consisting of: SEQ ID NO: 9 and SEQ ID NO: 11.

2. The method of claim 1, wherein the piscine-derived PYY peptide analogue has a half-life of greater than 2 hours under physiological conditions.

3. The method of claim 1, wherein the piscine-derived PYY peptide analogue has a half-life of greater than 2 hours against cleavage and/or degradation by dipeptidyl peptidase-4 (DPP-4) or a C-terminally directed protease.

4. The method of claim 1, wherein the method comprises administering the piscine-derived PYY peptide analogue every 24 hours.

5. The method of claim 1, wherein the method comprises administering the piscine-derived PYY peptide analogue before or while the patient is asleep.

6. The method of claim 1, wherein the method comprises administering the piscine-derived PYY peptide analogue in combination with at least one glucagon-like peptide-1 (GLP-1) receptor agonist.

7. The method of claim 6, wherein the at least one GLP-1 receptor agonist is liraglutide or exenatide.

8. The method of claim 6, wherein the method comprises administering the at least one GLP-1 receptor agonist while the patient is awake.

* * * * *